US009762462B2

(12) United States Patent
Cherifi et al.

(10) Patent No.: US 9,762,462 B2
(45) Date of Patent: Sep. 12, 2017

(54) METHOD AND APPARATUS FOR PROVIDING AN ANTI-BULLYING SERVICE

(71) Applicants: Verizon Patent and Licensing Inc., Arlington, VA (US); Cellco Partnership, Basking Ridge, NJ (US)

(72) Inventors: Tanya D. Cherifi, Basking Ridge, NJ (US); Ramesh Marimuthu, Edison, NJ (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 176 days.

(21) Appl. No.: 14/193,764

(22) Filed: Feb. 28, 2014

(65) Prior Publication Data

US 2015/0249584 A1    Sep. 3, 2015

(51) Int. Cl.
H04L 12/26    (2006.01)
G09B 19/00    (2006.01)
G09B 5/00    (2006.01)
H04L 29/08    (2006.01)
G06F 17/30    (2006.01)
G06Q 50/00    (2012.01)

(52) U.S. Cl.
CPC ............ *H04L 43/065* (2013.01); *G06F 17/30* (2013.01); *G06Q 50/01* (2013.01); *G09B 5/00* (2013.01); *G09B 19/00* (2013.01); *H04L 67/22* (2013.01)

(58) Field of Classification Search
CPC .................................................... H04L 43/065
USPC ........................................................ 709/224
See application file for complete search history.

(56) References Cited

U.S. PATENT DOCUMENTS

| | | | | |
|---|---|---|---|---|
| 7,725,547 B2* | 5/2010 | Albertson | ............... | G06F 3/016 382/107 |
| 2008/0201143 A1* | 8/2008 | Olligschlaeger | .... | H04M 3/2281 704/235 |
| 2010/0332373 A1* | 12/2010 | Crabtree | ................ | G06Q 50/06 705/37 |
| 2013/0013671 A1* | 1/2013 | Relan | ...................... | H04L 67/34 709/203 |
| 2013/0282897 A1* | 10/2013 | Siegel | .................... | H04L 45/02 709/224 |

* cited by examiner

*Primary Examiner* — Vivek Srivastava
*Assistant Examiner* — Sibte Bukhari

(57) ABSTRACT

An approach is provided for an anti-bullying service. A service platform monitors interaction data from one or more applications, wherein the interaction data is associated with an interaction between a source and a target. The service platform analyzes the interaction data to parse one or more indicators of a monitored conduct between the source and the target. The service platform then initiates at least one of (a) a recording of the interaction data; (b) a transmission of an alert message, the one or more indicators, the interaction data, the monitored conduct, or a combination thereof to a third party; and (c) a pushing of an anti-conduct application to a source device associated with the source, a target device associated with the target, or a combination thereof based on the monitored conduct, the one or more indicators, or a combination thereof.

20 Claims, 16 Drawing Sheets

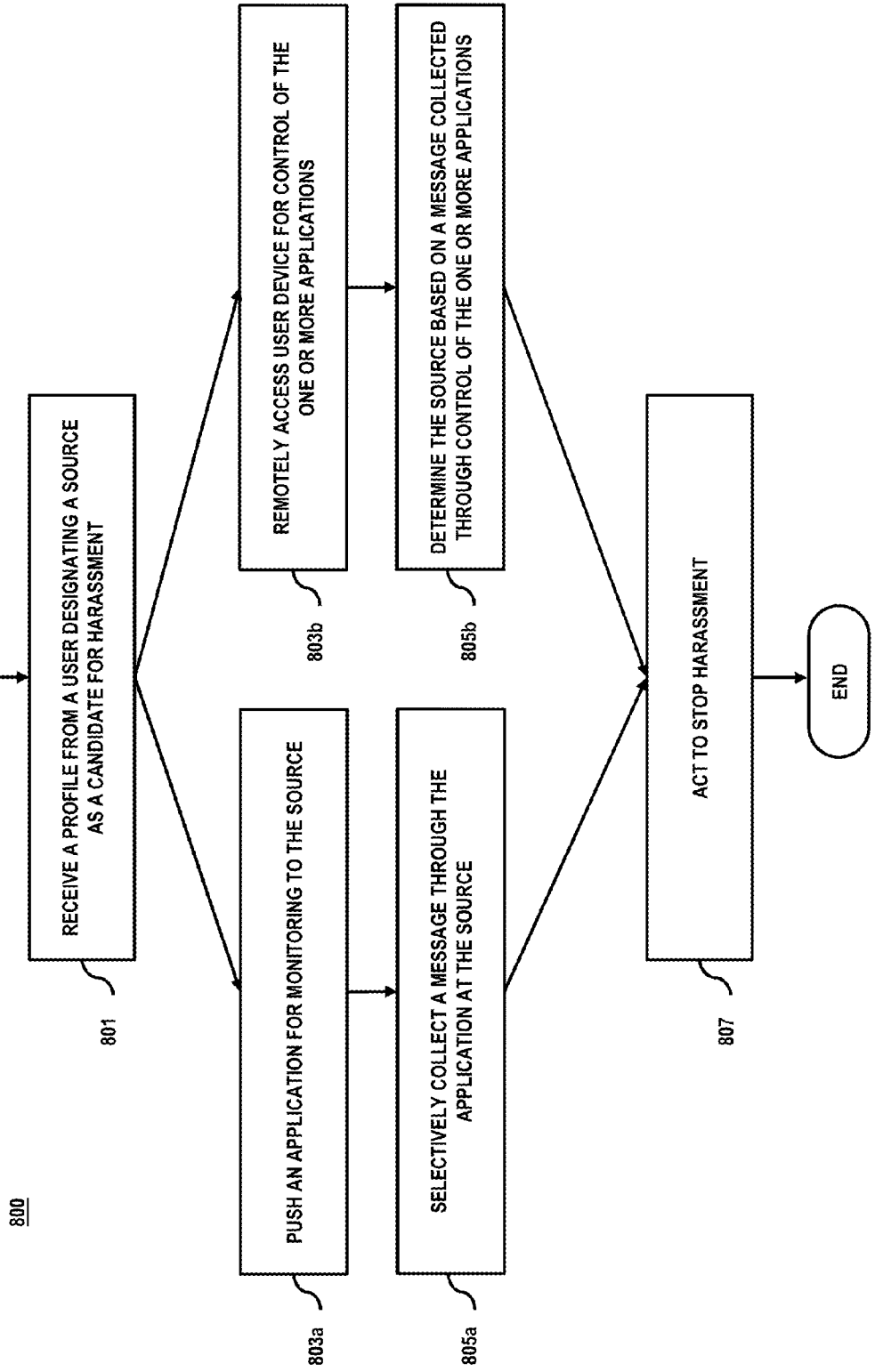

REPORT OF HARASSMENT 1000

HARASSER PROFILE: [HARASSER NAME] 1001
VICTIM: [VICTIM NAME] 1003

RELATED HARASSERS 1005:
   [HARASSER1]
   [HARASSER2]
   [HARASSER3]

RELATED VICTIMS 1007:
   [VICTIM1]
   [VICTIM2]

PROOF OF HARASSMENT 1009:

| APP | TIME/DATE | CONTEXT | MESSAGE |
|---|---|---|---|
| SMS | 22:00:00 2/2/2010 | H-> V | Hey [victim's name], you can't wait to see you in tomorrow |
| Email that | 22:10:00 2/2/2010 | H->H | Hey boys we're going to kill [victim's name] tomorrow. suck, school |
| Sd. Rec. all (sound | 12:00:00 2/3/2010 | Loc: School Lunchroom Accel. Effected | Idiot! Come here! Give me your money! *shaking* recording translation) |

FIG. 10

METHOD AND APPARATUS FOR PROVIDING AN ANTI-BULLYING SERVICE

BACKGROUND INFORMATION

Modern communications devices (e.g., smartphones, tablets, personal computers, etc.) enable users to receive and access a wealth of content and information from a variety of sources (e.g., other users, content providers, etc.). However, because users often are constantly attached to their devices, these same devices may also be used as sources of bullying or other forms of misconduct directed to the users or targets. As a result, the targets of such conduct (e.g., often children and adolescents) can potentially be subject to continuous bullying or other forms of conduct (e.g., harassing, offensive, and/or illegal conduct). As a result, service providers face significant technical challenges to providing services and applications for monitoring, preventing, reporting, and/or addressing potential misconduct directed from a source (e.g., a bully) to a target (e.g., a victim) via communication devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 8 is a flowchart of a process for harassment prevention by a third party, according to one embodiment;

FIG. 10 is a diagram of a harassment report generated by the harassment prevention platform, according to one embodiment;

DESCRIPTION OF EXAMPLE EMBODIMENTS

Apparatuses, methods, and systems for providing an anti-bullying service are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the preferred embodiments of the invention.

Although the various embodiments described herein are discussed with respect to providing an anti-bullying service (anti-cyber bullying, in particular), it is contemplated that the embodiments are also applicable to services for monitoring any form of conduct (i.e., monitored conduct) involving a source and a target. By way of example and not limitation, in addition to bullying-related conduct, such monitored conduct includes harassing conduct, offensive conduct, illegal conduct, conduct in violation of public and/or private rules or regulations, and the like. In yet other embodiments, the monitored conduct need not be negative conduct, but instead may include positive conduct such as conduct in compliance with rules and regulations, conduct that assists other users, altruistic conduct, etc.

Figure 1:
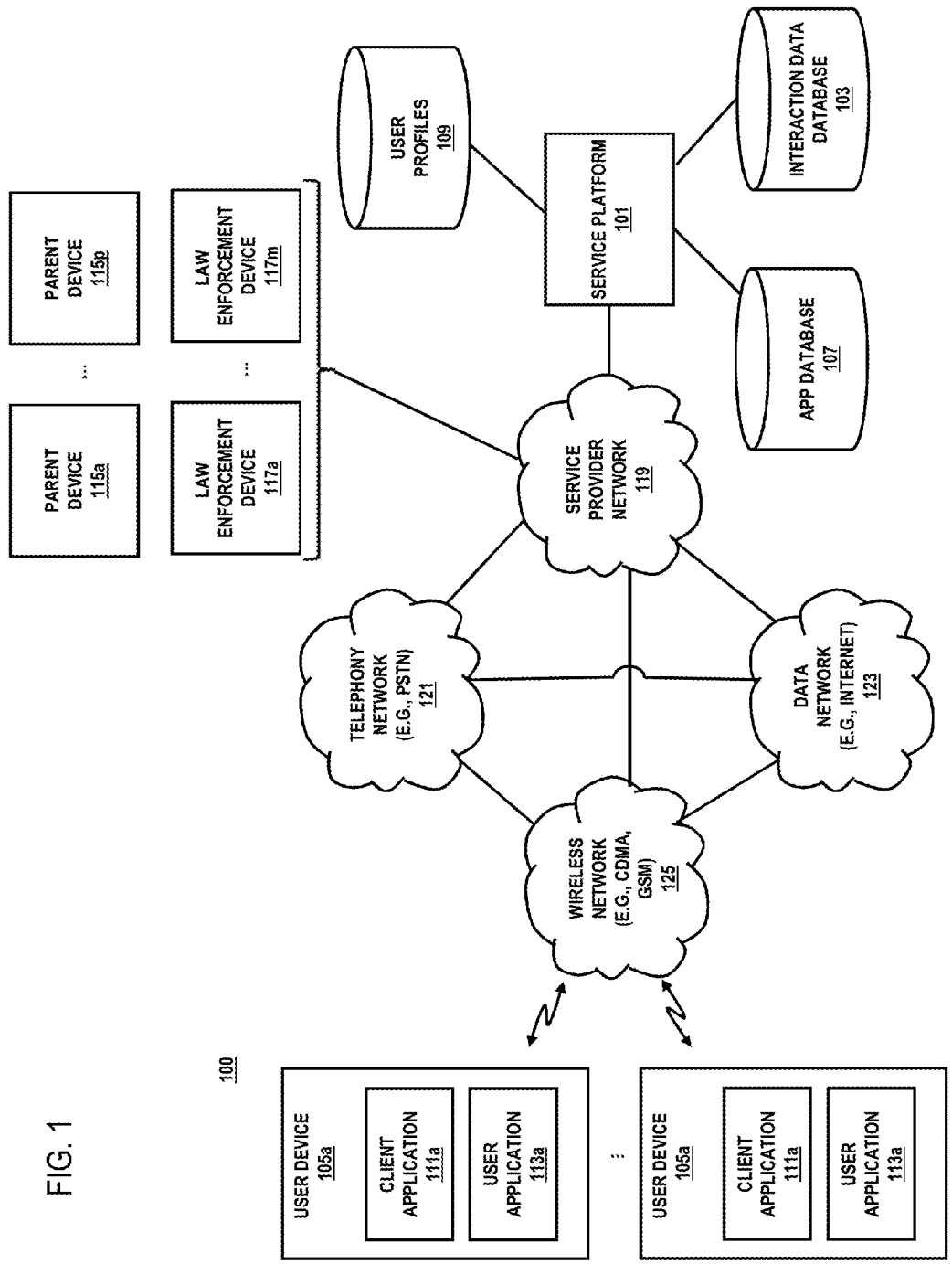
FIG. 1 is a diagram of a system capable of providing an anti-bullying service, according to one embodiment.

FIG. 1 is a diagram of a system capable of providing an anti-bullying service, according to one embodiment. As noted above, with greater accessibility to content and information over modern communications networks, users may also be more susceptible to bullying conduct (e.g., cyber bullying) or interactions facilitated over such communication devices and networks. By way of example, cyber bullying includes, for instance, a person's (e.g., a source's) tormenting, threatening, harassing, and/or embarrassing another person (e.g., a target) using communication applications such as voice calls, voice mails, text messages, multimedia messages, E-mails, browsers, social network applications, media sharing applications, navigation applications, etc. In some cases, if bullying conduct is not dealt with properly, cyber bullying potentially may result in grave consequences including substance abuse, suicide, and the like. In milder or less volatile cases, cyber bullying damages the self-esteem of the target (e.g., a targeted child or adolescent), causing potentially lifelong psychological and/or emotional issues. In many cases, responsible authorities (e.g., parents, teachers, law enforcement, etc.) are completely unaware of cyber bullying conduct being perpetrated on targeted individuals, and wish for a mechanism to provide earlier warning and/or intervention to prevent or stop such conduct.

To address this problem, a system 100 of FIG. 1 introduces a an anti-bullying service (or more generally, a conduct monitoring service) that analyzes application data to alert appropriate parties (e.g., targeted victims, parents, law enforcement, other authorities, etc.) about the occurrence of monitored conduct (e.g., bullying conduct, harassment conduct, etc.) between a source (e.g., a bully) and a target (e.g., a victim). In one embodiment, the system 100 stores records (e.g., "proof") of the monitored conduct (e.g., suspected cyber bullying instances) by collecting interaction data from various sources (e.g., applications, sensors, devices, etc.) and parsing the data for indications of the monitored conduct (e.g., by comparing parsed elements against a dictionary associated with the monitored conduct). In one embodiment, the system 100 also enables reporting of the stored records (e.g., to the target, the target's parents, the source's parents, law enforcement, school authorities, and/or other authorities) if they indicate a monitored conduct. These reports provide, for instance, data supporting the occurrence of the monitored to substantiate a bullying claim or other allegation of misconduct. In one embodiment, the stored records may also be used to capture otherwise transitory communications (e.g., Snapchat-like messages that are intended to disappear after a set time period). In one embodiment, the system 100 provides for automated monitoring, processing, and/or reporting of the conduct. In this way, to initiate the anti-bullying service, a user need only install or activate the service on his or her device(s). In one use case, potential victims or targets can proactively install or initiate the service. In another use case, parents of potential targets may latently install or initiate the service on behalf of the target.

In one embodiment, the reports of the potentially monitored conduct can assist the target victim and/or others to more easily and conveniently report the conduct to authorities for assistance. For example, the target or victim need not re-live the bullying, but instead, need only provide the stored records for consideration. Furthermore, the store records provide an alternate form of proof for the monitored conduct in cases where the original data source (e.g., messages, calls, etc.) has been deleted or is otherwise not available from the original user application 113.

In another embodiment, the system 100 enables parents or other authorities to intervene in potential misconduct earlier based on receiving the reports described above. For example, parents need not be left in the dark while their child is being bullied. On initiating the anti-bullying service, for instance, the system 100 can begin capturing and monitoring information on the child's device 105 to alert parents of potential bullying activities.

As shown in FIG. 1, one example embodiment of the system 100 includes service platform 101 that collects and organizes interaction data [e.g., voice calls, voice mails, text messages, SMS/MMS, emails, social networks, web pages, news feeds (e.g. news feeds, ticker blocks, blog feeds, forum feeds), images, videos, sound, interaction data related context information (e.g., device related GPS coordinates, distance data between two devices, accelerometer readings, time/date, etc.), recordings, links to games and applications, music, etc.] in an interaction data database 103. In one embodiment, the interaction data include data that are directed to or sent by users or user devices 105a-105n (also collectively referred to as user devices 105) by accessing applications in the app database 107 (also referred to as user applications) as related to the user devices 105.

In one embodiment, the user devices 105 are associated with one or more sources (e.g., bullies) of the monitored conduct and/or one or more targets (e.g., victims) of the monitored conduct. In one embodiment, user profiles 109 may be used in determining which user devices 105, client applications 111a-111n (also collectively referred to as client applications 111), user applications 113a-113n (also collectively referred to as user applications 113) are associated with which sources and/or targets. In one embodiment, the client applications 111 are clients of and interact with the service platform 101 to perform all or a portion of the functions of the service platform 101 with respect to providing an anti-bullying or other conduct monitoring service. The user applications 113, in one embodiment, are applications (e.g., calling applications, messaging applications, social networking applications, media sharing applications, navigation applications, etc.) that generate interaction data for processing by the service platform 101 and/or the client applications 111.

In one embodiment, the user devices 105 include mobile phones and/or another other computing device capable of receiving, accessing, sending, and/or storing interaction data. In one embodiment, the service platform 101 then determines interaction data to collect based on the user applications 113 and devices 105 related to the source of the harassment as well as the target. By way of example and not limitation, interaction data include words and phrases, names, images, sounds, videos, metadata and other interaction data related context information or other components of the interaction data that can be parsed. The interaction data may also be analyzed by a natural language processor in order to determine context of words and phrases used in the interaction data (in order to reduce false positives such as profanities used among friends). In one embodiment, the interaction data database 109 includes elements or factors (e.g. in a word or element dictionary that may be defined automatically or by the user) used in making the selection of additional interaction data. For example, the service platform 101 processes a text message, SMS or email to determine factors such as a source or harasser username, profanities, uncommon phrases used, and/or interaction data context related information. Based on the factors, the harassment prevention platform 101 can then apply filters to past and future interaction data to collect and organize the interaction data, thereby providing proof for a user to bring to authorities. Additional factors may include email or interaction data originating phone numbers, IP address (internet protocol address) or other digital identifiers.

Although various embodiments are described primarily with respect to text-based interaction data such as text messages, E-mails, social networking posts, blogs, etc., it is contemplated that the embodiments are also applicable to other interaction data including images, videos, sounds, location traces, sensor readings, etc. For example, image recognition technologies can be applied to parse or process image and/or video data to identify potential monitored conduct (e.g., making threatening gestures, making obscene gestures, performing vandalism, etc.). Similarly, speech/sound recognition technologies may be applied on audio recordings to identify potential monitored conduct (e.g., making threats, insults, or other spoken phrases used to annoy or abuse the victim). In yet another embodiment, location or sensor data may be used to identify movement or locations that might indicate that the source has approached the target in a potentially threatening manner (e.g., moving quickly towards the target, following the target for extended periods, maintaining close proximity to the target, etc.).

In one embodiment, a user initiates the service by installing or causing to be installed the client application 111 on a device 105. For example, the client application 111 may be installed on any known device 105 associated with a source or a target. In most cases, the anti-bullying service or other conduct monitoring service is installed on a target's or victim's device(s) 105 to monitor and gather data received from the source (e.g., bully or offender) through multiple channels (e.g., voice, messages, social networks, etc.).

In one embodiment, the client applications 111 enable third-parties (e.g., parents, law enforcement, or other authorities) to remotely access or control of the target's device 105. For example, the client applications 111 may grant remote access or control rights to any of the parent devices 115a-115p (also collectively referred to as parent devices 115), the law enforcement devices 117a-117m (also collectively referred to as law enforcement devices 117), and/or any other authorized third party devices. The client applications 111 also allow parent devices 115 and law enforcement devices 117 to remotely tunnel into the user device or application in order to collect more information about the harasser or source while also blocking interaction data from being accessed or received by the user devices 105. In another example, voice calls, text messages, multimedia messages, E-mail, voicemail, music, video, games, social networking feeds, etc. can be collected from other user devices 105 (e.g., neighboring devices 105, friend's devices 105, etc.), parent devices 115, and/or law enforcement devices 117 that may have relevant interaction data. In one embodiment, the applications 111 also enable users to screen interaction data (e.g., by blocking, masking, substituting, etc.). For example, blocking specific users, devices, applications or interaction data.

In one embodiment, the client application 111 can be remotely pushed to a device 105 associated with a source identified as the originator of the monitored conduct to perform interaction data collection and/or monitoring at the source's device 105. For example, law enforcement authorities with the help of carriers and/or service providers can push the application to the device 105. In this way, responsible authorities can monitor and/or gather data from the source's (e.g., a bully's) device(s) directly. For example, such monitoring can be used to identify additional targets or victims, networks of other potential offenders, and the like.

In one embodiment, the client application 111 (whether initiated at a target device 105 or a source device 105) can also be integrated into the device's firmware so that the application 111 will not be detectable in a control panel application or a task manager of the device. In another embodiment, the client application 111 can execute in the background with a non-obvious name to avoid detection by a user. In some embodiment, the client application 111 may include a limited or no user interface accessible to all users, and a more complete hidden user interface available to authorized users (e.g., parents, law enforcement, etc.).

In one embodiment, the service platform 101 and/or its anti-bullying service can be configured and managed through a companion website. As an example, a parent with more than one child, can have the anti-bullying service or other conduct monitoring service installed on multiple devices 105. All of these devices 105 can then be managed by the parent using the companion website. Even in a single child or single target scenario, the child could have multiple devices 105 managed through companion website.

In one embodiment, the system 100 enables an end user to configure a dictionary of words or elements (e.g., images, contextual scenarios, locations, etc.) that the user considers to be indicators of the monitored conduct (e.g., bullying conduct, offensive conduct, illegal conduct, etc.). Once configured, the system 100 can capture interaction data received through any channel from anyone at any time to monitor for the conduct. In the case of bullying, this helps to identify instances of bullying behavior from anyone not just pre-identified sources. The content received is validated against the pre-configured dictionary and the sources (e.g., bullies, offenders, etc.) are identified. In this way, a report that contains the source's identity, instances of monitored conduct, date/time/location of such conduct, and/or other related information can be generated and transmitted to external recipients.

Because of the reporting capabilities discussed above, the system 100, in one embodiment, is able to determine the identities of sources (e.g., bullies, offenders, etc.) including identifying information such as device MAC ID, Mobile Directory Numbers, aliases, E-mails, location information, personal identifiers, etc.), the date/time/duration/frequency of instances of monitored conduct, and/or the specific indicators (e.g., words, phrases, images, etc.) used during such conduct. In one embodiment, the identification information described above can be used to perform a comprehensive search for similar instances of monitored conduct. In some embodiments, unique phrases, modus operandi, etc. that can be extracted from the interaction data can also be used as search terms to identify the source or attribute other instances of monitored conduct to the source.

In one embodiment, when the anti-bullying service or other conduct monitoring service is initiated across multiple users and/or devices 105, the system 100 can keep track of what is happening in all instances of the service across those devices 105 to help identify trends, previously unknown sources or offenders, previously unknown targets or victims, or a combination thereof. In other works, in a bullying scenario, if Bully #1 does something to Victim #1, Bully #1 is likely to repeat the same behavior to Victim #2, #3, and so on. The networking or cross device capabilities of the system 100 identifies such repeating instances and creates chronological reports of such activities. In another example, Bully #1 shares his/her new method of bullying to Bully #2 or #3, and it is likely that Bully #2 or #3 might use this new method on their target victims. The system 100, in one embodiment, can consolidate all of those activities and report a pattern of bullying behavior that originates from one bully and spreads to other bullies in the network.

In one embodiment, the networking of devices 105 also enables the system 100 to capture related interaction data or direct the capture of additional interaction data from other devices 105 proximate to an instance of monitored conduct. For example, if remote security cameras (e.g., installed at a school) have coverage of a location associated with an instance of monitored conduct, then a system 100 can signal the remote cameras to capture video of the incident. The video can be captured and stored remotely, transmitted directly to the user device 105, transmitted to the service platform 101, or a combination thereof. In another embodiment, the other devices 105 may include devices of neighboring users within proximity of the instance of monitored conduct. For example, the microphones of neighboring devices 105 can be activated to record the instance of monitored conduct. It is contemplated that the user device 105 may communicate with the remote devices 105 via short range wireless communications (e.g., Bluetooth, WiFi, etc.) or long range wireless communications (e.g., cellular, WAN, etc.).

In one embodiment, the anti-bullying service can be initiated by individual users, groups of users, and/or as a parental control application on minors' user devices 105 such as mobile phone, video game systems, computers, and other electronic devices. For example, when used for parental control, parents can configure a minor's device 105 to block other users, devices applications, and/or interaction data while collecting the blocked interaction data. For example, with respect to a voicemail use case, if the minor receives a voicemail from a harasser or source, the voicemail does not appear at all on the minor's device 105 and is instead stored by the client application 111 for subsequent processing or action. In another embodiment, parents can also configure the user devices 105 to automatically forward any further interaction data to their parent devices 115 and/or law enforcement devices 117. The parent devices 115 might also not notify the victim's device 105 that the parents are keeping track of the situation in order to fully understand how their minor is reacting to such bullying.

In one embodiment, the client application 111 runs in the background of the user device 105 (e.g., a user's mobile phone or any other type of computer/device used by the user). In this way, the client application 111, for instance, functions as an "interaction data screener" during the processing of interaction data directed to or otherwise used at the device 105.

In another embodiment, the client application 111 can also function as an "interaction data reporter." By way of example, an "interaction data reporter" may assign a source of harassment as a sender to collect from and forward the interaction data to a user proxy such as a third party. The third party might include parents, educators, coaches, law officers, etc.

As described above, the service platform 101 and/or client application 111 may be implemented for an individual user so that the application 111 is running as, for instance, a background process of the user device 105. In addition or alternatively, the service platform 101 and/or the client application 111 can be implemented at a service provider network 119 (e.g., a carrier network) via, for instance, a voicemail platform on the service provider network 119. In this way, the service platform 101 performs its anti-bullying or conduct monitoring functions on the network side. In one embodiment, implementing the service platform 101 in the service provider network 119 enables servicing of potentially millions of subscribers of the service provider network 119. In yet another embodiment, the service platform 101 can be implemented as a cloud-based application to provide a carrier agnostic platform that can be used by multiple carriers, enterprises, and/or individual users.

In one embodiment, the service platform 101 can operate in either an offline processing mode or an online processing mode. For example, in an offline processing mode, the harassment prevention platform 101 performs its anti-bullying or conduct monitoring functions on interaction data that have been received and/or stored (e.g., by the user device 105 or other network service such as a voicemail platform). The processing of the interaction data to determine harassment candidates and screening can be performed in the background. In an online processing mode, the service platform 101, for instance, performs real-time screening and when interaction data is received or accessed rather than only filtering interaction data that have already been stored.

In one embodiment, the system 100 applies filtering of interaction data by installing client applications 111 at respective user devices 105 to perform all of a portion of the content filtering functions of the various embodiments described herein. In addition or alternatively, the service platform 101 may perform all or a portion of the filtering of interaction data. It is also contemplated that any other component (e.g., service provider voicemail platform) of the system 100 may perform all or a portion of filtering of interaction data in addition to or in place of the client applications 111 and the service platform 101.

In one embodiment, the interaction data database 103 may be configurable and/or set manually by the user (e.g., by manually reporting potential conduct and transcribing a received message, threat, etc.). More specifically, the user can set or modify default parameters based on the specific interaction data type in question (e.g., voicemails versus images, video, etc.). By way of example, the user may manually configure or set the interaction data database 103 on an ongoing basis for each type of interaction data. In other embodiments, the user may configure or set the interaction data database 103 on a one time or periodic basis; and then, the system 100 can derive or otherwise determine interaction data database 103 for other interaction data based on the initial configuration data. It is contemplated that interaction data database 103 can be specific to individual users, groups of users, enterprises, user devices, user applications, etc.

In one embodiment, the service platform 101 uses a natural language interface to filter interaction data. For example, the service platform 101 can recognize (e.g., via natural language processing) factors in the interaction data that can potentially match user-configured dictionaries associated with monitored conduct. In one embodiment, the service platform 101 is capable of recognizing abbreviations, nicknames, and other shorthand typically used in messaging or other communications that may also match factors in the conduct dictionaries.

In one embodiment, when the service platform 101 detects incoming interaction data the service platform 101 can also notify the originator of the interaction data, the recipient of the interaction data (e.g., the user), and/or other designated third parties (e.g. parents, managers, reporting authorities, law enforcement, etc.). For example, when notifying the recipient, the service platform 101 can specify who the sender is and organize and store the interaction data. When notifying the originator of the data (e.g., the sender), the service platform 101 can indicate to the sender that the intended recipient has decided to screen incoming interaction data from them because of the harassment. When notifying other designated parties, the service platform 101 can select which parties to notify based on contextual information. For example, if contextual information (e.g., location, time of day, etc.) indicates that a user is at work, the service platform 101 can notify the user's manager of interaction data. In one embodiment, such alerts or notifications can be logged and a historical report can be generated to determine the pattern of how someone has communicated over a period of time (e.g., months, years, etc.). For example, such patterns can be used to facilitate delivery of behavioral data or for law enforcement purposes.

In one embodiment, the service platform 101 interacts with the interaction data, client applications 111, user applications 113, user devices 105, parent devices 115, law enforcement devices 117, and other components of the system 100 through the service provider network 119. The service provider network 119, in turn, can interact with one or more other networks, such as a telephony network 121, a data network 123, and/or a wireless network 125. Although depicted as separate entities, networks 119-125 may be completely or partially contained within one another, or may embody one or more of the aforementioned infrastructures. For instance, the service provider network 119 may embody circuit-switched and/or packet-switched networks that include facilities to provide for transport of circuit-switched and/or packet-based communications. It is further contemplated that networks 119-125 may include components and facilities to provide for signaling and/or bearer communications between the various components or facilities of system 100. In this manner, networks 119-125 may embody or include portions of a signaling system 7 (SS7) network, or other suitable infrastructure to support control and signaling functions.

In exemplary embodiments, any number of users may access the harassment prevention platform 101 through any mixture of tiered public and/or private communication networks. According to certain embodiments, these public and/or private communication networks can include a data network, a telephony network, and/or wireless network. For example, the telephony network may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), 4G Long Term Evolution (LTE), fiber optic service (FiOS), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Additionally, the data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In one embodiment, a service platform 101 may perform filtering based on user requests. In one embodiment, the service platform 101 may match the user against user profiles 109 in order to validate the user request. In one embodiment, validating a request may be further based on matching one or more parameters in the request against the context of a user, user device 105, or combination thereof associated with the user's account as specified in, for instance, the user profiles 109. In one embodiment, the request to initiate filtering and rating of incoming interaction data may be based on a request to playback or otherwise access the interaction data. The user profiles 109 may specify interaction data factors for filtering along with tying user application and user devices to a specified user or harasser.

In one embodiment, the service platform 101 may create user configurable filters that are applied to incoming interaction data. As described above, the data or interaction data that may be selected include one or more interaction data, one or more information feeds, Internet content or a combination thereof. In another embodiment, the service platform 101 can maintain individual interaction data dictionaries for filtering of different originators (e.g., senders) of the interaction data. For example, when a user sends or receives interaction data from a harasser, the harasser's interaction data is filtered by the service platform 101. It is contemplated that service platform 101 can create any number of interaction data databases 103 for a given context and/or harasser (e.g., contact).

In one embodiment, the method of filtering is dependent on the type of interaction data that is to be filtered. For example, Internet content, video, images, etc. that are to be filtered may be parsed by related parts of a complete image or snippet of video, while interaction data may be filtered by parsing phrases or words from interaction data sent to the user. Parsing images includes biometric data of harassers. Sounds and voice can be separated and recognized by the filter to determine the sender(s). Recorded voices, videos and images may also use proximity context to determine which harassers or devices of harassers are nearby. It is contemplated that the system 100 may use any form of filtering applicable to a given data type.

In one embodiment, the service platform 101 may also determine a candidate harasser based on received or accessed interaction data. For example, should a source send interaction data to the user which the user either flags as harassing or the application decides is harassing based on interaction data database 103 factors the source is then selected as a candidate as a harasser. In one embodiment, the service platform 101 enables users to block interaction data from harassers. Accordingly, such blocked contacts will not be able to send interaction data to the user.

In one embodiment, the service platform 101 may present a user interface displaying a listing of the interaction data, application, and harasser. In one embodiment, the user interface may be presented at the user devices 105 and/or any other component of the system 100 capable of presenting the user interface.

In one embodiment, the service platform 101 may record all voice calls from identified harassers either by phone number identification, through voice identification, or manually selected by the user. The voice call is then recorded, parsed and analyzed, and the entire call or relevant sections of the call may be organized in the harasser profile.

In one embodiment, the service platform 101 may take recorded voicemail data, parse the voicemail and save any identified harasser voicemails. The identified voicemails may be automatically parsed and analyzed or manually selected for collection in the harasser's profile.

In one embodiment, the service platform 101 has the ability to recognize the voice of a harasser through direct sound monitoring at a user device. Once the harasser voice is recognized any later sounds, images, contextual data, or combination thereof as selected or automated by the user or authority. These sounds may be heard through a user device or external microphone attached to user device. This may also be used by authorities to remotely record instances of harassment. Also, should the harasser have a client application 111 pushed to his/her device, further instances of harassment as well as discussions among the harasser and related harassers can recorded.

In one embodiment, the service platform 101 has the ability to recognize the harasser through image or video collection. The image or video collector on the user device or harasser device may be monitored for biometric signatures of a known harasser. Once the harasser is recognized, the service platform 101 may begin recording images, sounds, contextual data, or combination thereof as selected or automated by the user or authority. These sounds may be heard through a user device or external microphone attached to user device.

Figure 2:
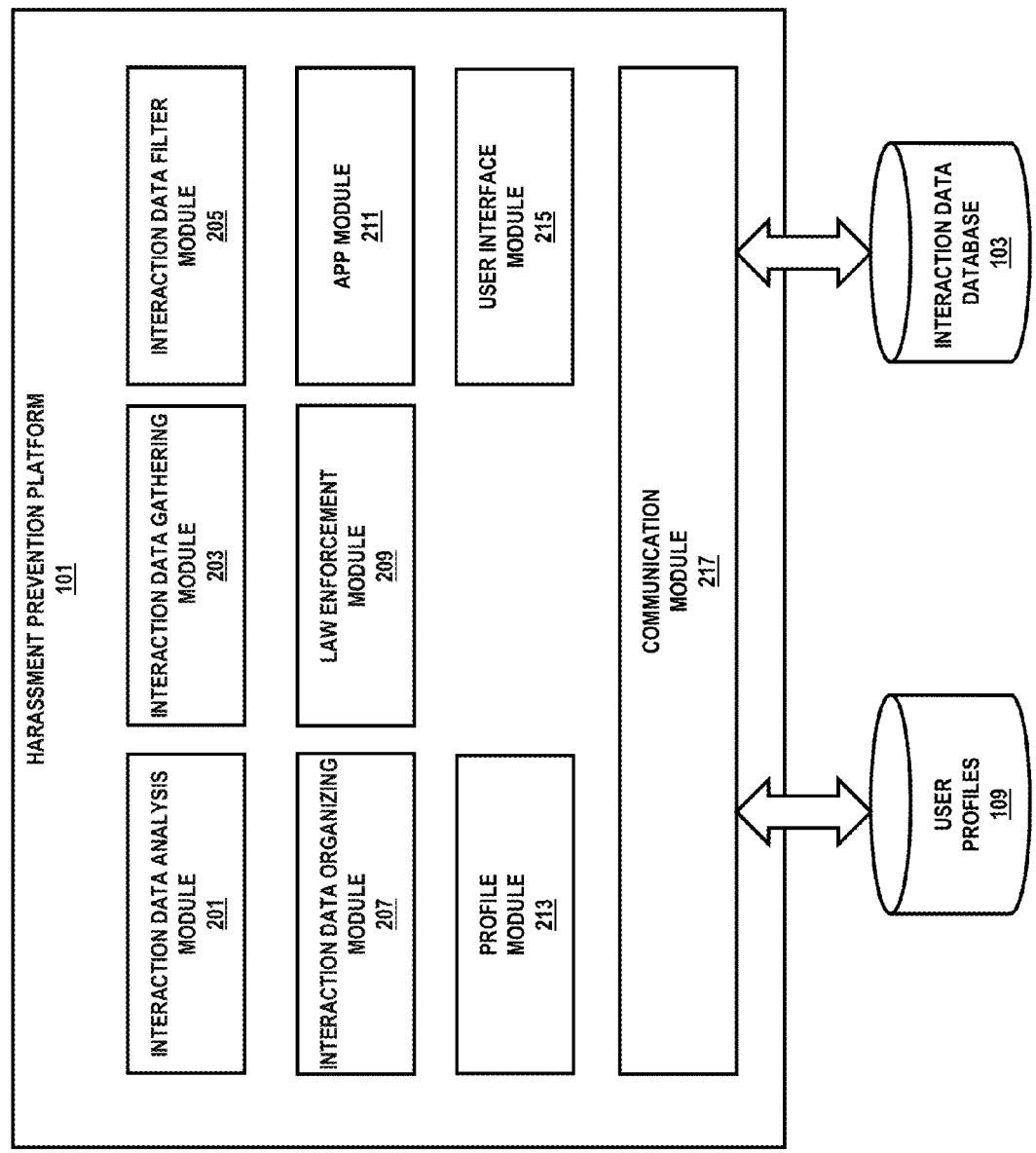
FIG. 2 is a diagram of components of a service platform for providing an anti-bullying service, according to one embodiment.

FIG. 2 is a diagram of components of a service platform 101, according to one embodiment. The service platform 101 includes various executable modules for performing one or more computing, data processing and network based instructions that in combination provide a means for preventing harassment. Such modules can be implemented in hardware, firmware, software or a combination thereof. Although the service platform 101 is depicted as a stand-alone component, it is contemplated that the service platform 101 and/or its functions may be implemented in other components of the system 100 including the user devices 105 and the service provider network 119.

By way of example, the service platform 101 may include interaction data analysis module 201, interaction data gathering module 203, interaction data filter module 205, interaction data organizing module 207, a law enforcement module 209, an app module 211, a profile module 213, a user interface module 215, and a communication module 217. These modules 201-217 can interact with user profiles 109 and interaction data (e.g., stored in the interaction database 103) in support of their functions. According to some embodiments, the user profiles 109 and interaction data are maintained and updated based, at least in part, on one or more operations (e.g., communications operations) or transactions conducted on user devices 105.

In one embodiment, the interaction data analysis module 201 begins by parsing interaction data that are directed to or originating from a target user device 105 or source device 105 (e.g., a bully device) to split the interaction data into pieces that the interaction data filter module 205 can use. In one embodiment, an image parsing recognizes parts of an image that may be important, recognizing objects that may be differentiated from the background of an image. For example, recognizing the shape of part or a whole person, shapes of objects, available text or other important background formations. For video content the interaction data analysis module 201 analyzes the video images themselves determining key moving objects, as well as any image related parsing such as recognizing a person walking may be a form of identification through gait. In one embodiment, sound analysis separates different pitches or tones in order to separate out each person that might be speaking on a voicemail. In yet another example, key phrases or words may be parsed to help the interaction data filter module determine uncommon uses of specific terms or phrases which might be used in identifying a source or harasser.

In one embodiment, the interaction data filter module 205 processes the parsed image, words, and/or sounds recognizing factors that are present in the interaction data. In one embodiment, the factors and the means for recognizing those factors can be dependent on the type of interaction data along with context of the interaction data. For example, for voicemail interaction data, the interaction data filter module 205 can use a voice recognition engine to convert speech to identify the speaker, and parse the words as factors that are contained in the voicemail. The speech recognition may also determine stress level of the speaker as well as whether the speech is in anger or jest. The parsed words may be used to determine common, uncommon phrases or terms used in harassment of a victim. For image content, the interaction data filter module 205 can use image or object recognition to identify visual objects as elements in the image messages. The interaction data filter module 205 can use biometric data (e.g., eye, finger, height, facial recognition, gait, etc.) to determine the identity of persons in an image or video. It is contemplated that the interaction data filter module 205 can support any mechanism for parsing or recognizing individual elements within the range of available types of interaction data. Text such as new feeds or blog postings along with comments may be parsed as well as the usernames tied to each harassing posting/message or other interaction data. The interaction data filter module 205 may also parse metadata and context data with regards to the interaction data by detailing other proximate devices, user and IP address of source devices/harassers and times/dates of sending.

After identifying factors that are present in specific interaction data, the interaction data analysis module 201 interacts with the interaction data gathering module 203 to collect the interaction data that have been filtered. In one embodiment, the interaction data gathering module 203 compares or matches the identified factors against one or more defined factors in the interaction data database 109 that may be specified by a user along with automatically added. In the case of interaction data that might be associated with monitored conduct, the interaction data analysis module 201 relates an interaction data to a source which may then be designated a source (e.g., bully or harasser) of the monitored conduct. The interaction data factors compared may increase or decrease the likelihood of interaction data being filtered and flagged as harassing. For example, this weighting can be applied to certain terms or words or mere presence of a word or factor can trigger a filtering of the interaction data. In one embodiment the weighting is applied to image and/or sound recognition as well as user recognition.

In one embodiment, the interaction data gathering module 203 searches through saved data related to interaction data applications and on devices. In another embodiment, the interaction data gathering module 203 analyses current, real-time accessed, received and/or sent data and filters and collects the interaction data. Furthermore, the interaction data gathering module 203 may find that certain applications, devices or users are more likely or less likely to have sent harassing interaction data and as such more detailed analysis by the interaction data analysis module 201 will be made. For example, an application that a source or harasser generally uses will have more interaction data from the harasser and as such a more detailed analysis of all the interaction data collected by the application may be used.

In one embodiment, the interaction data filter module 205 can determine user or default preferences to select the appropriate operation for interaction data. In one embodiment, the preferences can be retrieved from the user profiles 109. In some embodiments, the interaction data filter module 205 may use contextual information (e.g., date, time, location, history, etc.) to determine the operations to performed. For example, interaction data with a high profanity rating may be blocked or screened during a user's work hours but only flagged during non-work hours. In another example, contextual information regarding the presence of other users (e.g., presence of children) can be used as at least one factor for determining an appropriate operation for rated interaction data.

In one embodiment, the interaction data filter module 205 can filter by blocking, masking, substituting, etc. the user from seeing and/or collecting interaction data through the interaction data gathering module 203. For example, with respect to a use case where interaction data are voicemails being filtered, when a voicemail is directed to or originating from a user device 105 (e.g., a mobile phone or any other electronic device), the voicemail is screened in the background (e.g., via offline processing) or in real-time (e.g., via online processing) for profanity. In this example, the user has the ability to configure what operations to perform harassing portions of the interaction data.

In one embodiment, the service platform 101 also includes interaction data organizing module 207 for organizing collected interaction data in a coherent way. For example, the interaction data organizing module 207 takes the collected interaction data and renames or places the interaction data in chronological order or combines them into one file with separate interaction data separated by application/device.

In one embodiment, the service platform 101 also includes a law enforcement module 209 aids in remotely accessing a user or harasser device as well as in pushing the client application 111 to victim or harasser devices. For example, parents may want to know why their child is acting oddly and push the application 111 to their child's device in order to see if their child is being bullied. The parent, law officer or other third party may use the device to turn on, from the background of the device, different aspects of the devices such as video, image or sound recording. The third party may also remotely access the victim device by acting as the victim and collecting information from the harasser by interacting with the harasser. As well as, at least, simply forward or intercept interaction data from a harassing source. In one embodiment, the third party may also petition a service provider to push the harassment prevention application 111 to the harasser device. Once this is done, the third party may also remotely access the harasser device in order to collect more information on the harasser, their related harassers and any additional victims by acting as the harasser.

In one embodiment, the service platform 101 also includes an app module 211 that uses the factors from the interaction data database 103 to determine applications and devices related to a user. For example, the factors may tie a specific harassing user to specific applications where the user has used the same or similar usernames. The app module 211 may use those factors to determine additional applications and devices which need to be monitored further.

In one embodiment, the service platform 101 also includes a profile module 213 that is used to create additional factors for filtering through user profile additions such as users setting additional devices, self-related profiles such as introducing ethnicity, sexual preferences, etc. which may relate to words or terms used by a harasser.

As shown, the service platform 101 also includes a user interface module 215 that enables user interaction with the service platform 101. In one embodiment, the user interface module 215 facilitates generation of various interfaces for enabling users to interact with the service platform 101. This includes, for example, generation of a login interface for enabling user registration and/or access to the content screening and rating services. More specifically, the user interface module 215 can present harassment prevention information to users via graphical representations. In another embodiment, the user interface module 215 supports reporting functions (e.g., by presenting harassment prevention reports that, for instance, list interaction data along with their respective context) as well as factors for filtering the interaction data.

In one embodiment, the user interface module 215 supports a website portal which provides an alternative method to use various features and functions of the service platform 101. For example, the web portal can be used to during configuration of the individual features (e.g., customizing dictionaries, specifying rating levels and criteria, etc.).

In one embodiment, the communication module 217 executes various protocols and data sharing techniques for enabling collaborative execution between the service platform 101, the user devices 105, the client applications 111, the user applications 113, the networks 119-125, third party devices 115 and 117, and other components of the system 100. In addition, the communication module 217 enables generation of signals for communicating with various elements of the service provider network 119, including various gateways, policy configuration functions and the like.

Figure 3:
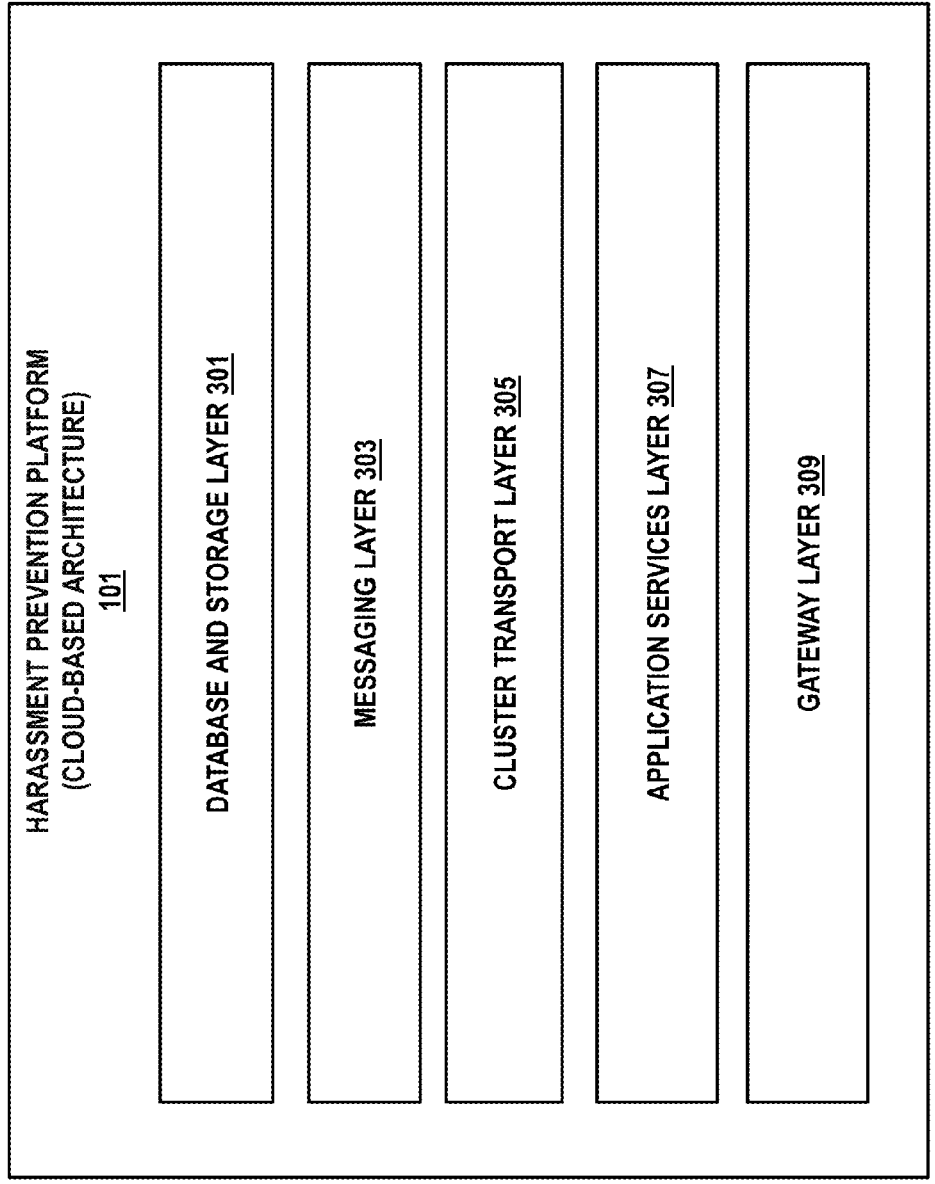
FIG. 3 is a diagram of an architecture for providing an anti-bullying service, according to one embodiment.

FIG. 3 is a diagram of a cloud-based architecture for a providing an anti-bullying service, according to one embodiment. The example architecture of FIG. 3 is provided as an example and is not intended as a limitation. It is contemplated that the various embodiments of the system 100 described herein can be applied on any equivalent architecture. By way of example not limitation, the service platform 101 can be implemented as: (1) an individual user-based implementation, (2) a carrier-based implementation, and/or (3) a cloud-based implementation. As previously noted, an individual-based implementation can be based on the client applications 111 executing on user devices 105. The applications 111, for instance, will run in the background of a user's mobile phone or other type of computer/device and provide content screening and rating for that particular device. Interaction data would also be stored or otherwise processed at the device 105.

In a carrier-based implementation, the service platform 101 will be run on the carrier's network 119 (e.g., the carrier's voicemail platform in the case of screening and rating interaction data that are voicemails). In this carrier-based approach, the service platform 101 can serve all of the subscribers of the implementing carrier. In a use case where the interaction data to be screened and rated are voicemail, the user's voicemails will be stored at the server level. Also, the processing (e.g., rating and screening) will be performed at the server level. The voicemail will be played back at the user device 105 by using audio streaming or by downloading the audio file and playing back the file locally.

In a cloud-based approach, the service platform 101 can run in a cloud network, thereby making the platform 101 a carrier agnostic platform that can be used by multiple carriers, enterprises, and/or individual users. In a use case where the interaction data to be screened and rated are voicemail, the user's voicemails will be stored at the cloud server level. Similar to the carrier-based implementation, a voicemail will be played back at the user device 105 by using audio streaming or by downloading the audio file and playing back the file locally.

As shown in FIG. 3, in one embodiment, a cloud-based service platform 101 includes, for instance, a database and storage layer 301, a messaging layer 303, a cluster transport layer 305, an application services layer 307, and a gateway layer 309. In this example, cloud-based interaction data are stored in the database and storage layer 301. The database and storage layer 301 includes, for instance, multiple storage area networks (SANs), databases, and/or other storage nodes for storing high volumes of interaction data (e.g., voicemail audio files).

The messaging layer 303 used to communicate between different layers 301-309. The cluster transport layer 305 communicate services to link the application services layer 305 to the database and storage layer 301. The application services layer 307 contain modules and engines for applications and services that support the content screening and rating functions of the service platform 101. These modules and engines include the modules described with respect to FIG. 2 as well as other engines such as: enterprise rules engine, subscriber rules engine, carrier rules engine, voicemail harassment prevention engine, E-mail harassment prevention engine, text harassment prevention engine, speech harassment prevention engine, social media posts harassment prevention engine, movie harassment prevention engine, web portal services, master harassment prevention engine, law enforcement services, search and reporting services, billing provisioning and account services, data encryption services, and/or the like.

In one embodiment, the application services layer 307 is accessed by subscribing carriers, enterprises, individuals, and/or other subscribers through the gateway layer 309. The gateway layer 309 enables, for instance, implementation of a multi-tenant enterprise service platform 101. More specifically, the cloud-based service platform 101 of FIG. 1 is designed so that the platform 101 can be used to service multiple wireless carriers or Mobile Virtual Network Operators (MVNOs), enterprises, and other subscribers.

In one embodiment, carriers, enterprises, etc. can customize the service platform 101 to provide unique features and a customized look and feel. For example, the cloud-based service platform 101 is a multi-tenanted platform that can be sliced any number of times based on demand. To serve multiple tenants and allow for customization, the service platform 101, for instance, can dedicate a percentage of its architecture (e.g., 80%) as standard among the tenants and a remaining percentage (e.g., 20%) is available for customization by carriers and enterprises. In one embodiment, subscribers can be differentiated by mobile number or other unique identifier so that the subscribers will receive the features that are assigned to them.

Figure 4:
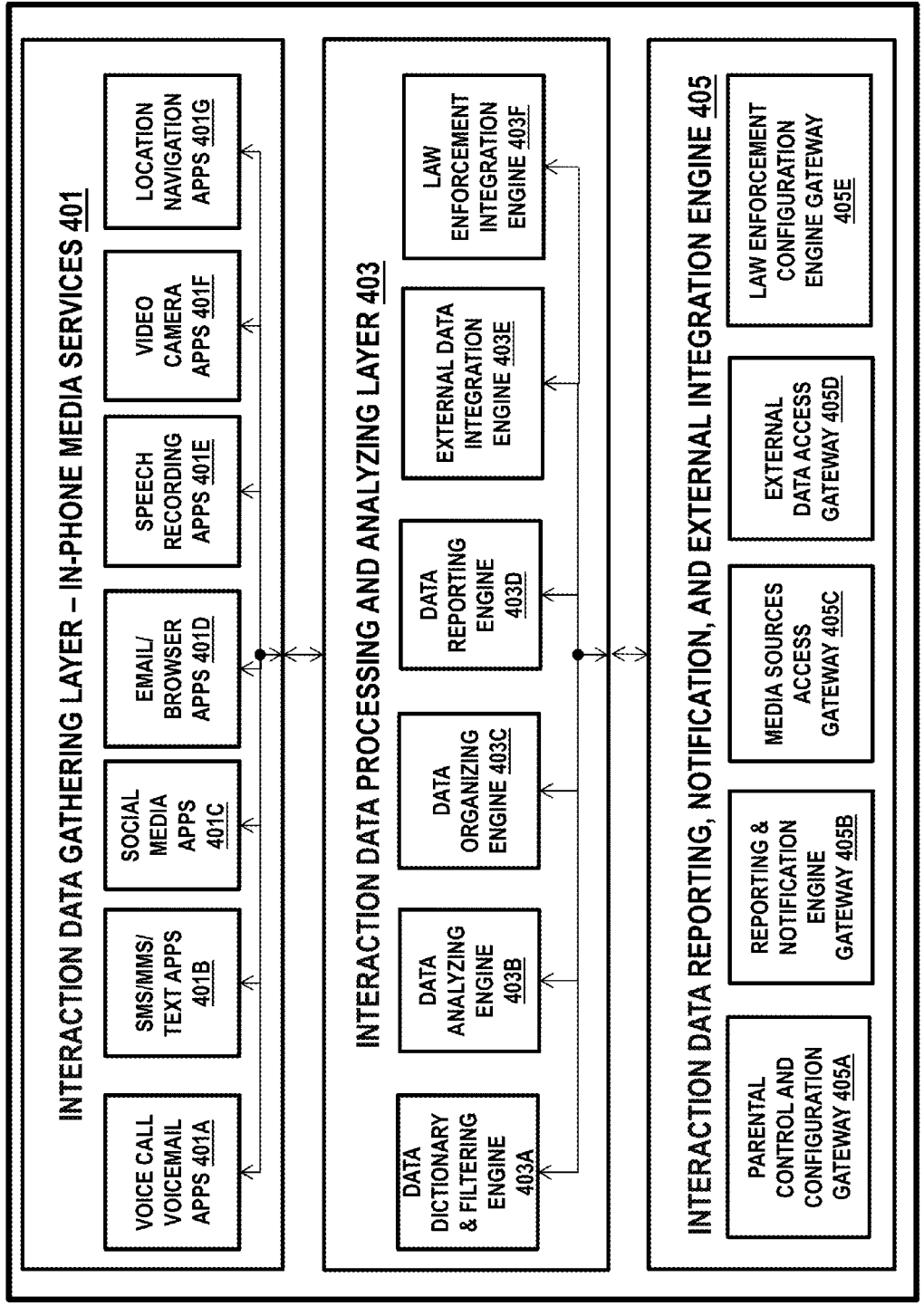
FIG. 4 is a diagram of architecture for interaction data collection and processing for a harassment prevention platform, according to one embodiment.

FIG. 4 is a diagram of architecture for interaction data collection and processing for an anti-bullying service, according to one embodiment. The architecture for interaction data includes interaction data gathering layer 401, interaction data processing and analyzing layer 403 and interaction data reporting, notification and external integration engine 405. In one embodiment, the layers 403 and 405 may be implemented in-device or in the cloud. Each layer may include multiple apps, services, engines and gateways, or combination thereof. In one embodiment, the interaction data gathering layer 401 may include voice call voicemail apps 401A, SMS/MMS/text apps 401B, social media apps 401C, email/browser apps 401D, speech recording apps 401E, video camera apps 401F, location navigation apps 401G, etc. Each application relating to a different type of interaction data such as text, images, sound, video, navigation coordinates, etc. In one embodiment, the interaction data processing and analyzing layer 403 may include data dictionary and filtering engine 403A, data analyzing engine 403B, data organizing engine 403C, data reporting engine 403D, external data integration engine 403E, law enforcement integration engine 403F, etc. which take the interaction data and processes them by parsing the interaction data to determine important information or data. In one embodiment, the interaction data reporting, notification, and external integration engine 405 may include parental control and configuration gateway 405A, reporting and notification engine gateway 405B, media sources access gateway 405C, external data access gateway 405D, law enforcement configuration engine gateway 405E, etc. used in reporting, extracting and accessing the stored interaction data.

Figure 5:
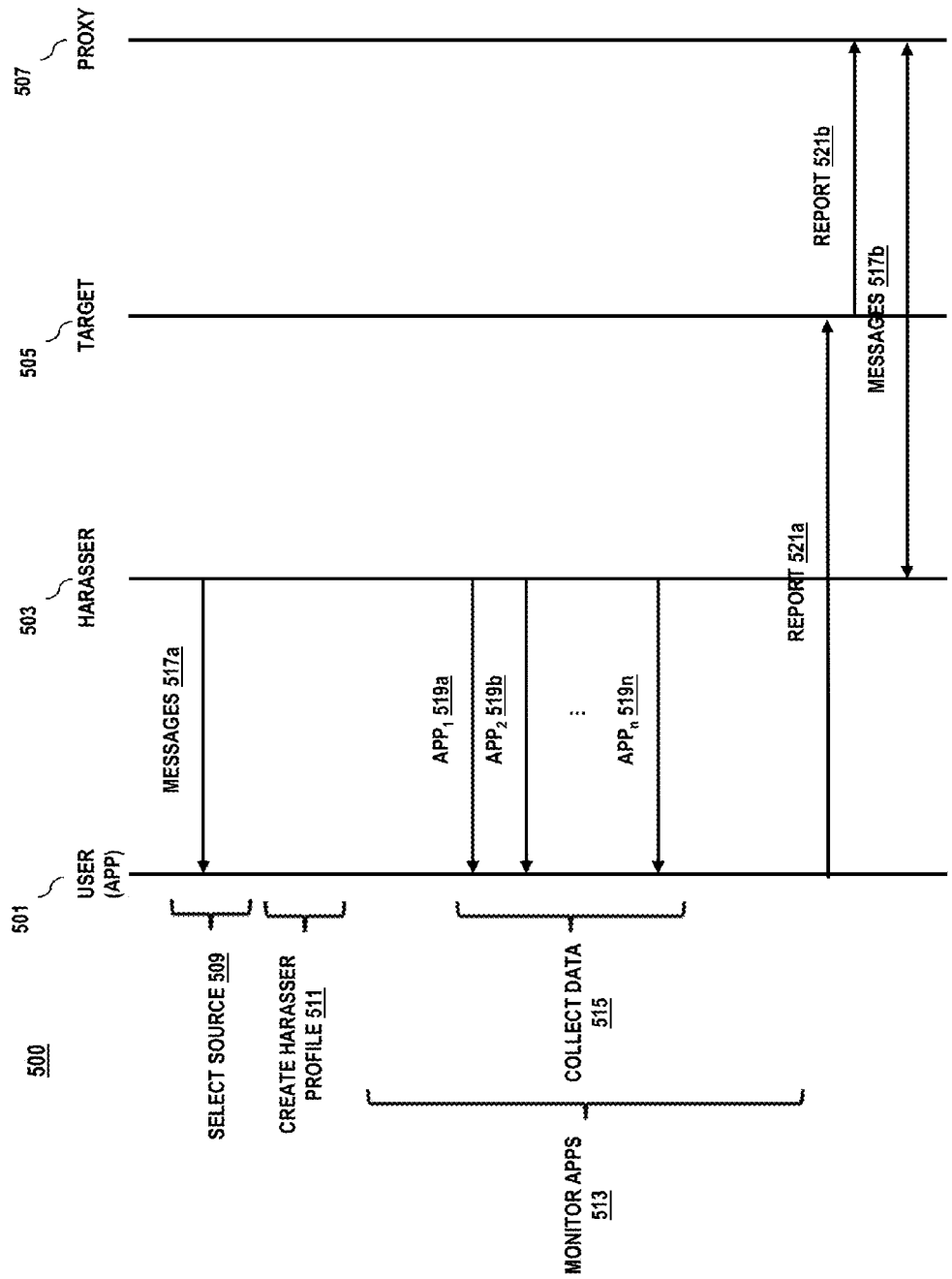
FIG. 5 is a diagram of a process for harassment prevention by a user, according to one embodiment.

FIG. 5 is a diagram of a process for harassment prevention by a user, according to one embodiment. In one embodiment, the user 501 has a device with the application installed which is receiving interaction data 517a from the harasser 503. The user then selects the harassing source 509 within the application by including the interaction data and all its contextual data and creates a harasser profile 511 for the source. The harasser continues to send interaction data or use applications 519a-n to harass the user. All the while the service platform 101 is monitoring 513 the applications and devices related to the harasser and collecting 515 any and all interaction data used in harassing the user.

Once all that information is collected the user may feel more secure that an authority figure will help them stop the abuse and the user sends a report with all the applicable interaction data organized in a coherent manner for the authority figure 505 to see and use. This reporting might also occur earlier in the process and could happen as soon as the harasser profile is created. Should the authority 505 be a law enforcement agency they may find the need to learn more about the harasser and petition a proxy 507 such as a service provider to give them access to a harasser's device and pretend to be the victim or take over the harasser device by pushing the harassment prevention application 113 to the victim or harasser device and continue messaging 517b between the harasser and pretend victim or harasser and related harassers in order to gain more information about the harasser and their actions.

Figure 11:
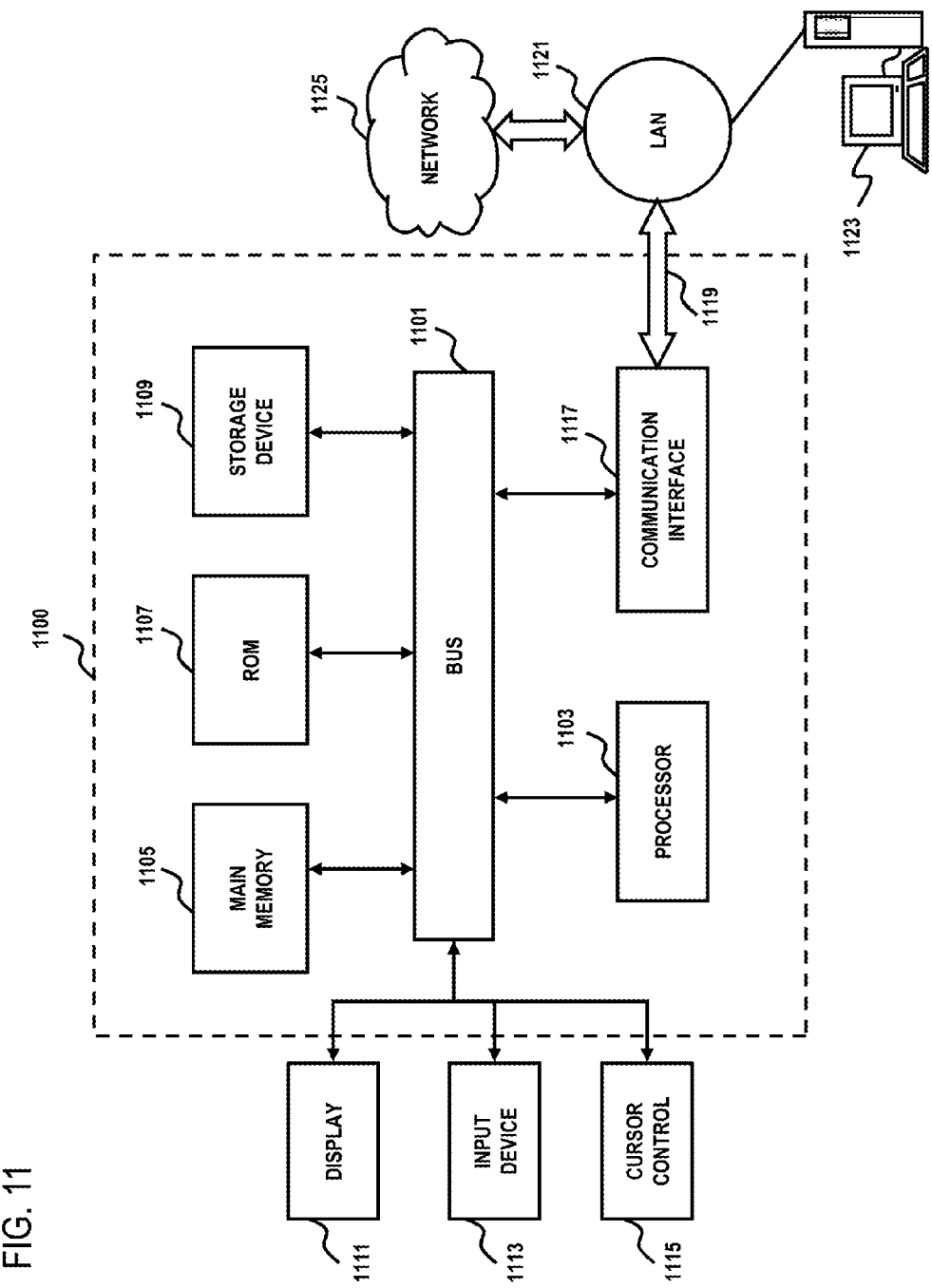
FIG. 11 is a diagram of a computer system that can be used to implement various exemplary embodiments.

In one embodiment, the service platform 101 performs the process 500 and is implemented in, for instance, a chip set including a processor and a memory as shown in FIG. 11. In addition or alternatively, the harassment prevention application 113 may perform all or a portion of the process 500.

Figure 6A:
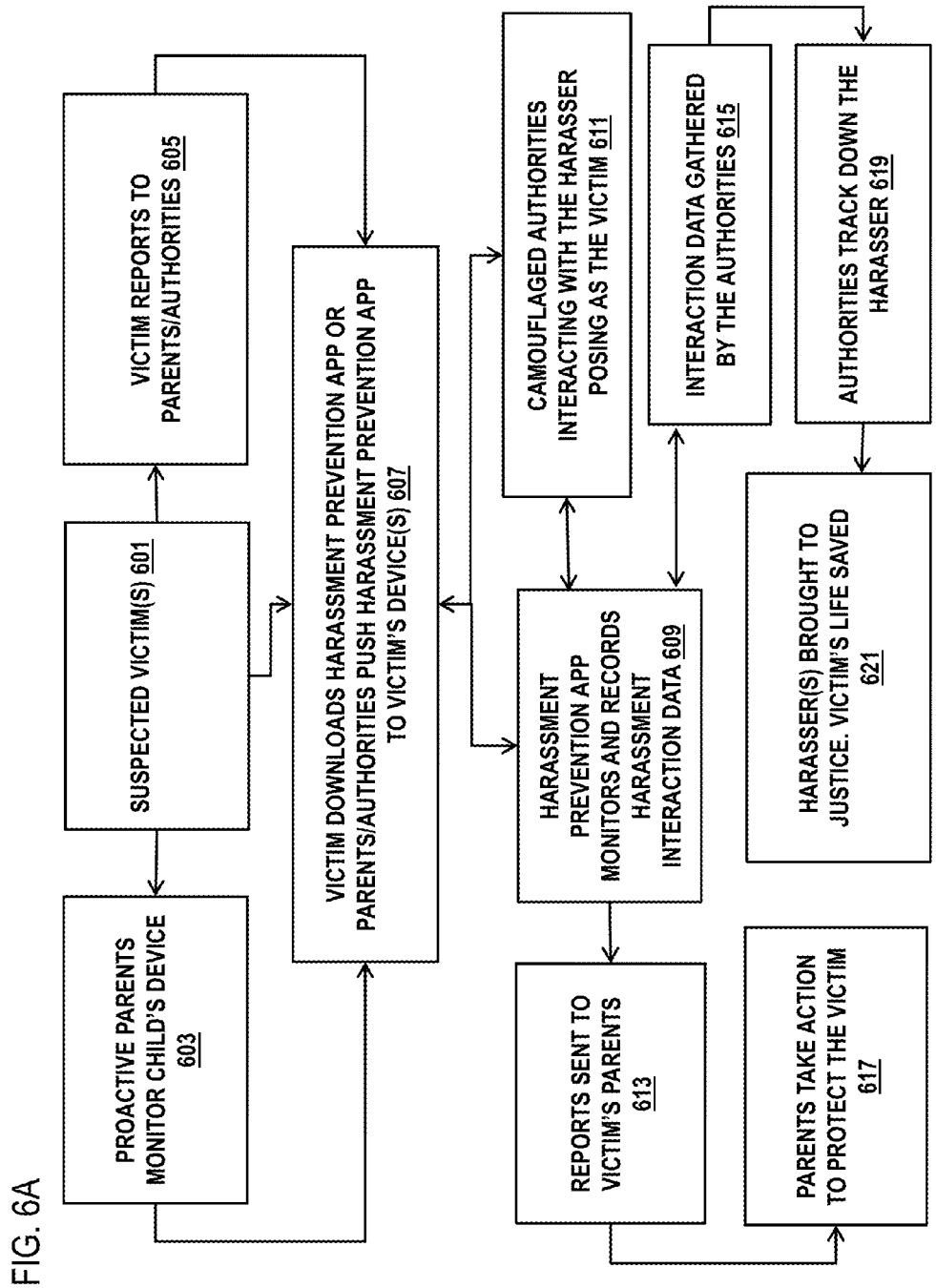
FIGS. 6A-6B are flowcharts of the general process for harassment prevention through the user device and harasser device, according to one embodiment.
Figure 6B:
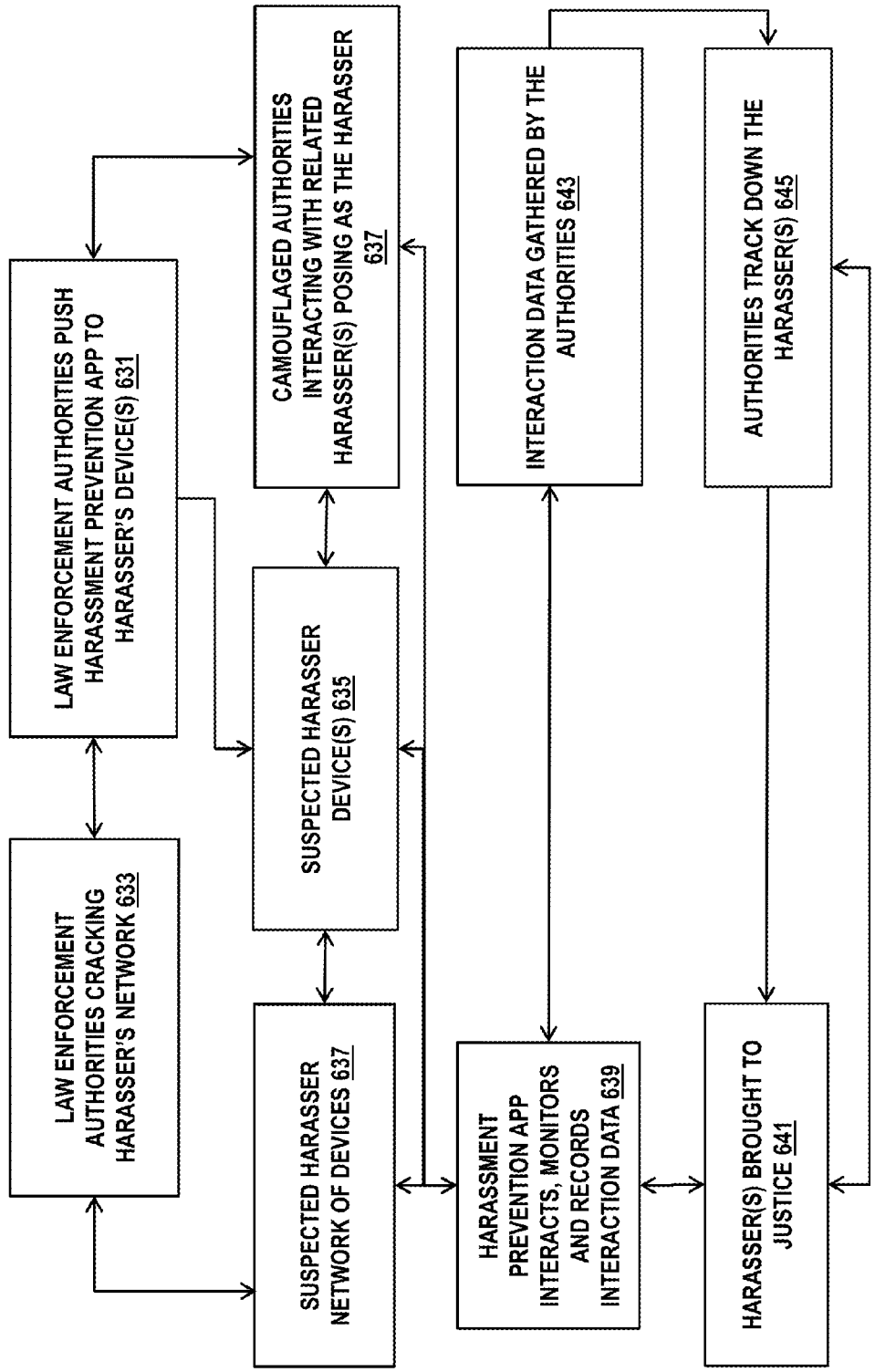

FIGS. 6A-6B are flowcharts of the general process for harassment prevention through the user device and harasser device, according to one embodiment. FIG. 6A is a flowchart of the general process for harassment prevention through the user device, in one embodiment, wherein a suspected victim 601 may: (1) have parents that suspect the harassment 603 due to changes in a child's demeanor or other signs, (2) notify parents or authorities 605 of the harassment, or (3) downloads the harassment prevention app or parents/authorities push the harassment prevention app to the victim's device. The harassment prevention app then either: monitors and records harassment interaction data 609 which might include searching past stored interaction data, or (2) camouflaged authorities interact with the harasser posing as the victim 611 to gather more interaction data to better determine the extent of such harassment, block harassment to the suspected victim, and better identify the harasser. The interaction data is then either sent to the victim's parents as a report 613 and they take action to protect the victim 617, or gathered by the authorities 615 as a report or data and used to track down the harasser 619 in order to bring the harasser to justice 621.

FIG. 6B is a flowchart of the general process for harassment prevention through the harasser's device(s), in one embodiment, wherein the law enforcement authorities push a harassment prevention app to the harasser's device(s) 631 which run undetected and is used to: crack the harasser's network 633, identify the harasser device(s) 635 and camouflage authorities interacting with related harassers posing as the harasser 637, or combination thereof. These actions may also further aid in the identification of other victims as well as other harassers creating a network of harassment which may be stopped. The harassment prevention app then interacts, monitors and records the interaction data 639 which may be used to bring the harasser(s) to justice 641 and lead to tracking down more harassers 645 or more interaction data may be gathered and used by authorities 643 to further identify and track down the harasser(s) 645 which may be brought to justice 641.

Figure 9:
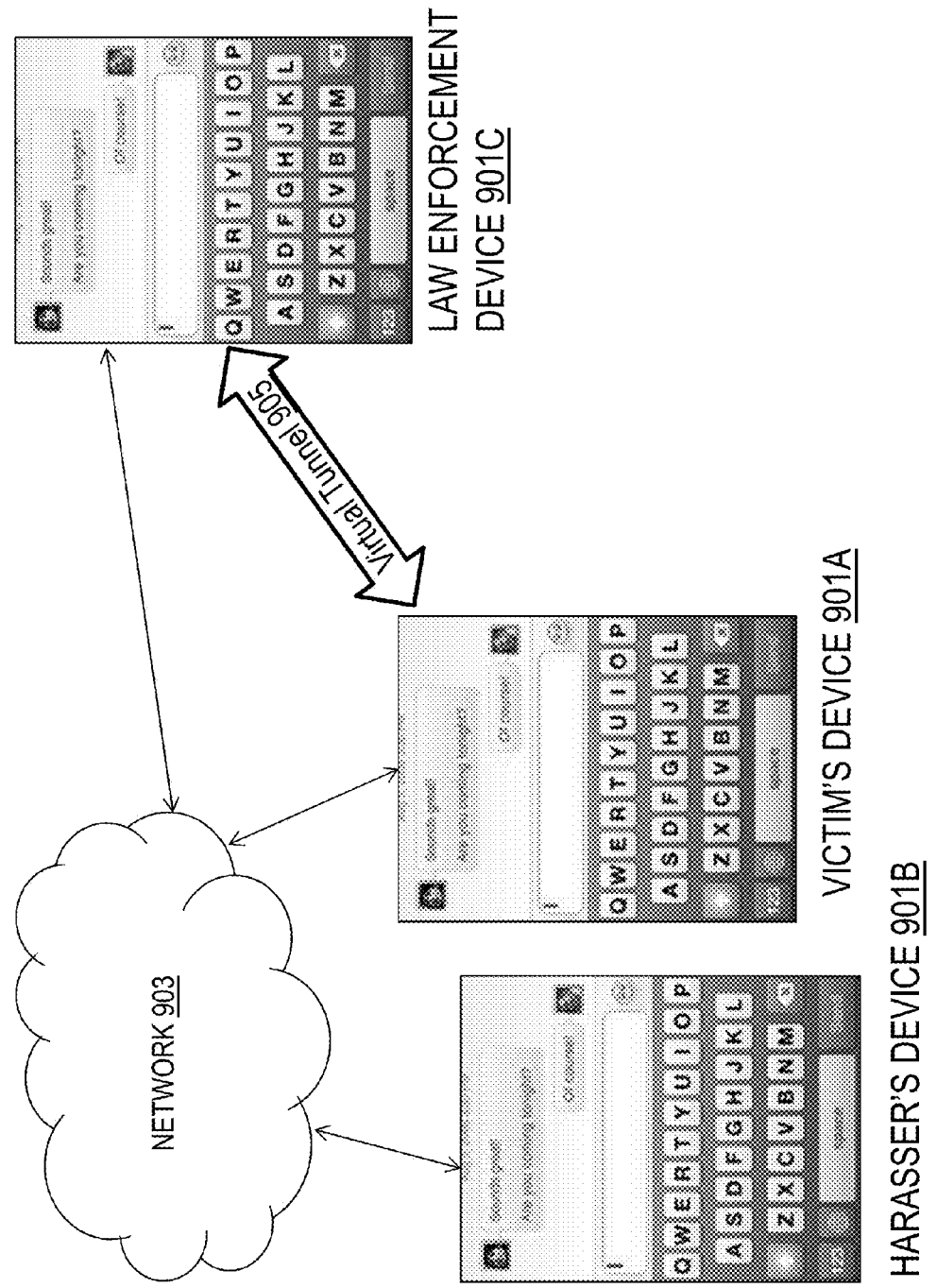
FIG. 9 is a diagram of user interfaces for harassment prevention by a third party, according to various embodiments.

FIGS. 7A-7D are flowcharts of processes for providing an anti-bullying platform, according to one embodiment. In one embodiment, the service platform 101 performs the processes 700, 720, 740, and 760 and is implemented in, for instance, a chip set including a processor and a memory as shown in FIG. 9. In addition or alternatively, the client application 111 may perform all or a portion of the processes 700, 720, 740, and 760.

Figure 7A:
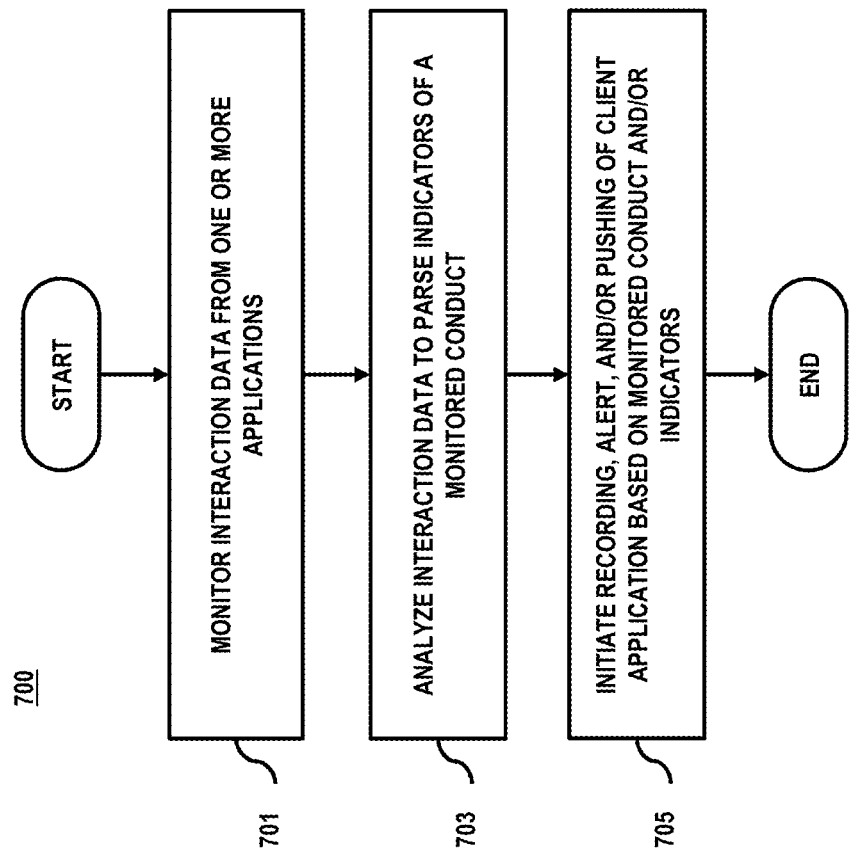
FIGS. 7A-7D are flowcharts of a process for harassment prevention by a user, according to one embodiment.

FIG. 7A illustrates the process 700 for monitoring and analyzing interaction data, according to one embodiment. In step 701, the service platform 101 monitors interaction data from one or more applications, wherein the interaction data is associated with an interaction between a source and a target. In one embodiment, the interaction data includes messaging data, calling data, contextual data, or a combination thereof associated with the source, the source device, the target, the target device, or a combination thereof. In another embodiment, the monitored conduct includes a bullying conduct, an offensive conduct, an illegal conduct, or a combination thereof. As previously discussed, the example conduct of described in step 701 is intended for illustration and not limitation. The type of conduct that can be monitored the service platform 101 can include any negative or possible conduct or interaction between the source and target that can be parsed by the service platform 101.

By way of example, the one or more application monitored by the service platform 101 (e.g., user applications 113 executing on user devices 105) can include communications applications that support voice calling, video calling, messaging, E-mails, social networking, internet browsing, navigation activities, and/or any other form of real-time or non-real-time communications between the source and target.

In one embodiment, the service platform 101 monitors other interaction data between one or more other sources, one or more other targets, or a combination thereof for the one or more indicators, the monitored conduct, or a combination thereof. For example, in scenarios where additional devices 105 or other sensing devices (e.g., remote cameras, microphones, etc.) are available to the service platform 101 and/or the monitored devices 105, the additional devices 105 and/or sensing devices may be used independently or cooperatively to provide alternate recordings or collection of interaction data associated with a detected instance of monitored conduct.

In step 703, the service platform 101 analyzes the interaction data to parse one or more indicators of a monitored conduct between the source and the target. As previously discussed, in one embodiment, parsing includes using recognition technologies applicable to one or more media types. For example, speech/sound recognition can be used to parse words and/or non-verbal utterances (e.g., crying, screaming, laughter, etc.) from sound-based interaction data. In some embodiments, interaction data may include sensor-based data (e.g., location information for determination a colocation of the source and target; accelerometer data for determining specific movements of the source and/or target). The parsed information (e.g., indicators), for instance, words, sounds, movements, gestures, etc.

In one embodiment, the service platform 101 compares the one or more indicators to a dictionary of one or more reference indicators to identify the monitored conduct. In one embodiment, the service platform 101 may employ dictionaries that define or specify indicators that are indicative of a particular monitored conduct or behavior. For example, word-based indicators that indicate bullying may include threatening words, profane words, belittling words, and the like. Non-verbal indicators may include crying sounds, sensor data indicating running, location data indicating stalking, etc. It is contemplated that a default dictionary can be defined for each type of monitored conduct (e.g., bullying conduct, illegal conduct, offensive conduct, praise worth conduct, etc.).

In one embodiment, the service platform 101 can also support user-defined dictionaries and/or monitored conduct. For example, the service platform 101 can receive an input for customizing the dictionary for the source, the target, the monitored conduct, or a combination thereof. In one embodiment, the dictionary can be customized as interaction data is processed, whereby the service platform 101 can suggest indicators for inclusion in a particular dictionary and its associated monitored conduct based on the analysis of the interaction data. The user can then confirm or reject the suggested indicators.

In step 705, the service platform 101 initiates at least one of (a) a recording of the interaction data; (b) a transmission of an alert message, the one or more indicators, the interaction data, the monitored conduct, or a combination thereof to a third party; and (c) a pushing of an anti-conduct application to a source device associated with the source, a target device associated with the target, or a combination thereof based on the monitored conduct, the one or more indicators, or a combination thereof. In other words, based on the interaction data, the indicators, and/or the monitored conduct, the service platform 101 can take actions that will result in creating a history of any potential monitored conduct, alerting appropriate parties, and/or automatically increasing monitoring capabilities by installing or otherwise activating latent monitoring functions on relevant user devices 105.

In one embodiment, the anti-conduct application includes the client application 111 described above. For example, the client application 111 provides a remote access capability, a remote control capability, a remote monitoring capability, or a combination thereof by the third party with respect to the source device, the target device, or a combination thereof. It is contemplated that the anti-conduct application can be any application that can used to address or respond to the detected conduct. The specific application and/or application can be configured by the user, service providers, carriers, law enforcement, parents, and or other authorities. Examples of other types of applications to push include content filtering applications, communication blocking applications, etc.

Figure 7B:
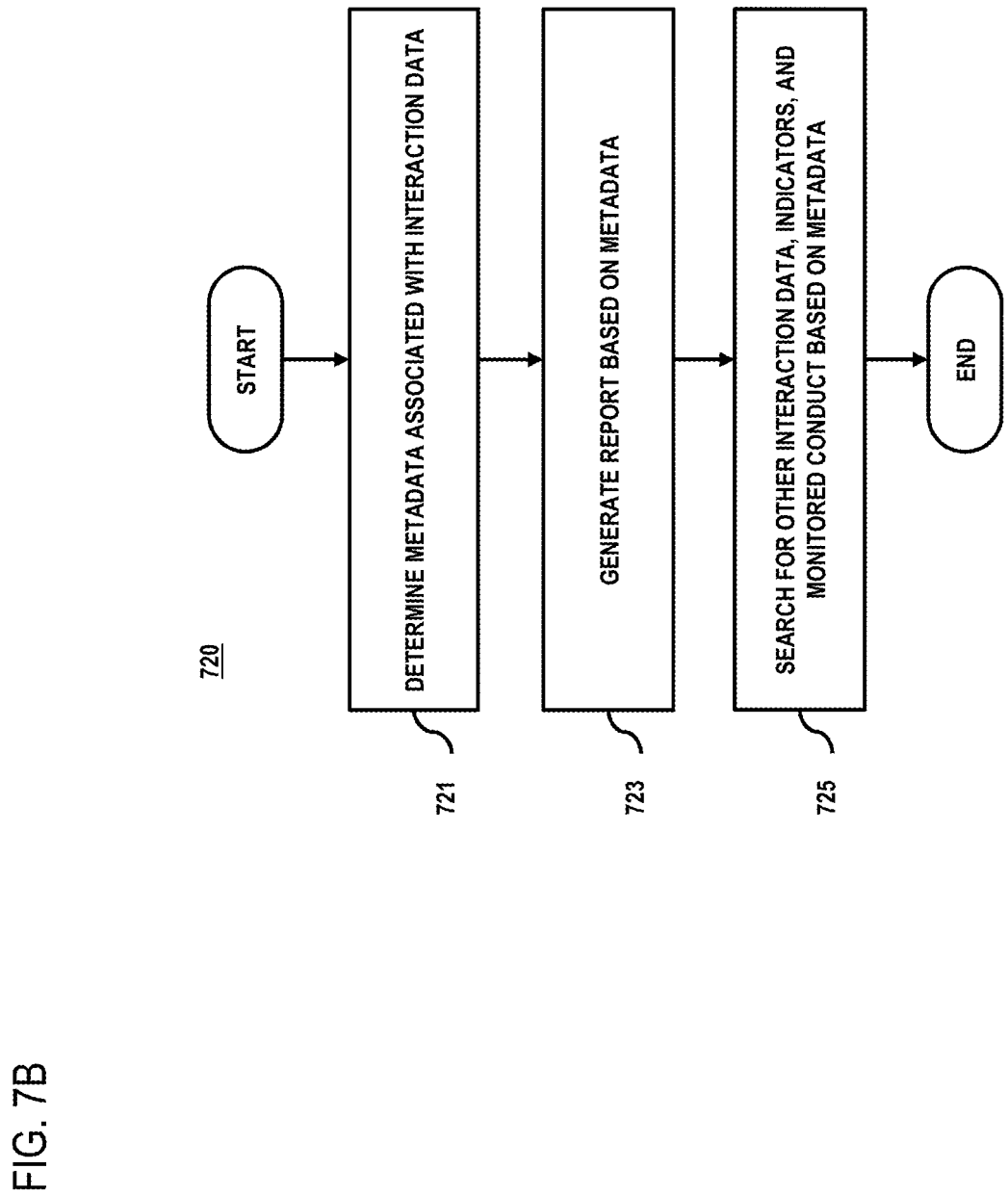

FIG. 7B illustrates the process 720 for determining metadata associated with interaction data for reporting and/or searching, according to one embodiment. In step 721, the service platform 101 determines metadata associated with the interaction data, the source, the source device, the target, the target device, or a combination thereof. For example, when a particular set of interaction data indicates a monitored conduct (e.g., bullying), the service platform 101 can retrieve, determine, or otherwise access metadata associated with the interaction data. In one embodiment, the metadata includes contextual information (e.g., date, time, location, activity, etc.), device identification data (e.g., MAC addresses, IP addresses, phone numbers, account numbers, usernames, aliases, etc.), network identification data (e.g., carrier identification, type of network, etc.), communication identification data (e.g., message identifier, URL address, etc.), or combination thereof.

In step 723, the service platform 101 generates a report of the interaction data, the monitored conduct, the metadata, or a combination thereof. In one embodiment, if different user identifiers is trace back to a common user (e.g., via IP addresses, etc.), interactions associated with the different user identifiers can be grouped or assumed to originate from the same source or target. In one embodiment, non-traditional forms of identifiers (e.g., unique behavioral identifiers) can be determined from the interaction data. For example, unique contextual combinations (e.g., location, time, and activity) may be indicative of a single. In another example, unique wording or phrasing in messages (e.g., using the same unique combination of words for a particular threat) can be used to identify interaction data as originating from the same source.

In one embodiment, devices 105 can be networked to share detected monitored conduct and/or associated sources. For example, if one particular source is a primary source of bullying, other users or potential targets within proximity of the source can be alerted to the potential for monitored conduct from that particular source. Moreover, in a bullying scenario, specific bullying tactics (e.g., as determined from the interaction data) can be shared among the network. This sharing, for instance, can also be used to identify and associated a trend of instances of a monitored conduct that spans across multiples sources and/or multiple targets.

In addition to using the metadata for reporting purposes, any metadata indicating a unique source can be used to perform a more comprehensive search. For example, in step 725, the service platform 101 searches for other interaction data, one or more other indicators, other monitored conduct, or a combination thereof based on the metadata. This search can be used to identify a common source, a common form of conduct perpetrated by multiple sources, or a combination thereof.

Figure 7C:
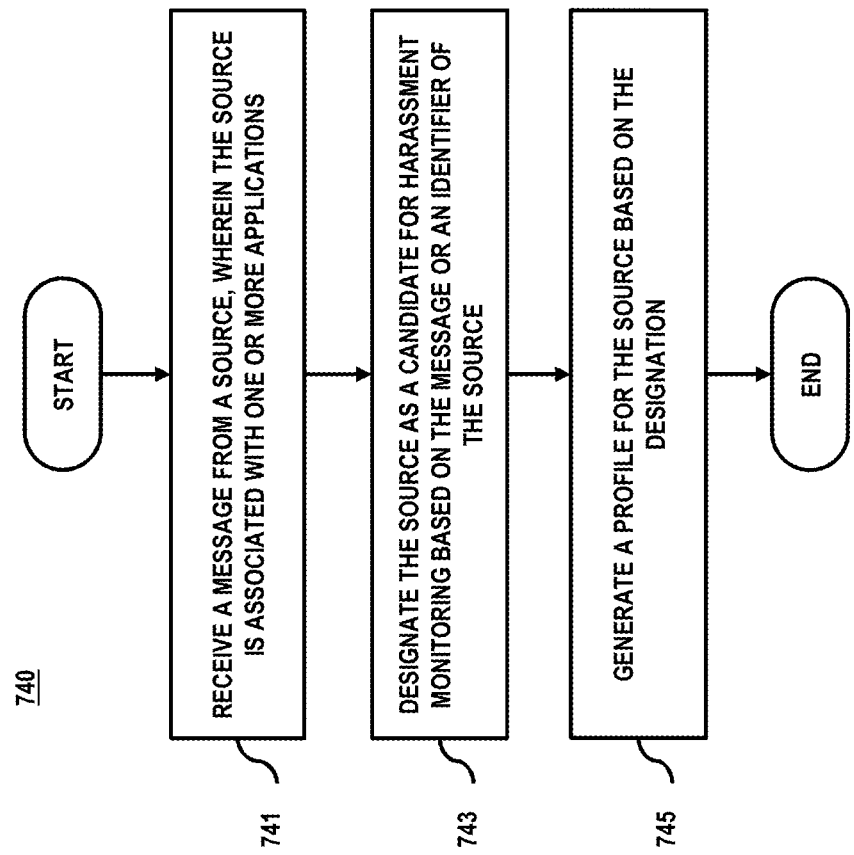

FIG. 7C illustrates the process 740 for generating profiles based on analyzing interaction data, according to one embodiment. In step 741, the service platform 101 from the user receives interaction data from a source, wherein the source is associated with one or more applications. In some embodiments the source includes applications, persons, and/or devices. In one embodiment, the interaction data received may be an image, MMS, video, sound recording, voicemail, voice call, text message, SMS, web page, news feed, etc. which may be separated into different types of interaction data and handled by the service platform 101 in different manners. Interaction data types may include video/image, sound, and text based messages. In one embodiment, the service platform 101 can monitor (e.g., at the user device 105) for interaction data which are accessed by, received by, or sent from the user device 105 or a set of user devices 105 associated with the user. This association of devices might be determined through the user profile 115. For example, the service platform 101 can perform filtering of interaction data with different factors for an individual device 105, a set of devices 105 associated with a single user, as set of devices 105 associated with a group of users 105 or a combination thereof. In one embodiment, applications include cell phone applications, computer programs, web based applications, device applications, etc.

As discussed previously, the type of processing to determine factors of the interaction data is determined by the interaction data type. Accordingly, the service platform 101 can employ speech recognition engines, natural language processing engine, image or object recognition engines, sound or voice recognition engines, and the like to identify individual factors within interaction data. The factors in interaction data may be used to determine whether a source is harassing the user and select the source as a candidate for harassment. Factors might be predefined or determined by tone or context of interaction data. For example, when processing a voicemail message, the service platform 101 applies a speech recognition engine to parse individual words as factors of the interaction data, determine the speaker's mental state, and attempt to identify the source through biometric voice recognition functions. In another embodiment, when processing a video the service platform 101 applies an image and object recognition engine to parse the image into different objects and to recognize key elements within the video that might be factors. The image and object recognition engine might also be used to attempt to identify the source through biometric data such as facial recognition, height and weight knowledge, gait, or combination thereof. In another embodiment, when processing text the service platform 101 applies a natural language processing engine to parse words and phrases that might be factors and also use uncommon words or phrases to identify the source.

In one embodiment, the source is associated to applications through the initial interaction data (the application the interaction data was sent through). In one embodiment, the source is associated to applications through any additional applications which the source uses the same identifier or similar identifiers. In one embodiment, the source is associated to applications through any other applications on the devices or group of devices which the source is associated with. Each interaction data is then analyzed and filtered as needed.

In step 743, the service platform 101 from the user designates the source as a candidate for harassment monitoring based on the interaction data or an identifier of the source. In one embodiment, the initial selection of the source by the user automatically makes the source a candidate for harassment monitoring. In one embodiment, the designation of the source as a candidate for harassment is through searching through past stored interaction data on the device. In one embodiment, the designation of the source as a candidate for harassment is through processing of the user selected interaction data and metadata through the aforementioned engines.

In step 745, the service platform 101 from the user generates a profile for the source based on the designation. The source profile may be continuously updated with more knowledge of the source as well as association between various sources (e.g., bullying often occurs by multiple persons at a single victim as well as single bullies using multiple identifiers), applications (e.g., bullying often occurs over multiple applications) and interaction data. The source profile may also track other contextual data related to the source and relate the interaction data sent by the source to the profile.

Figure 7D:
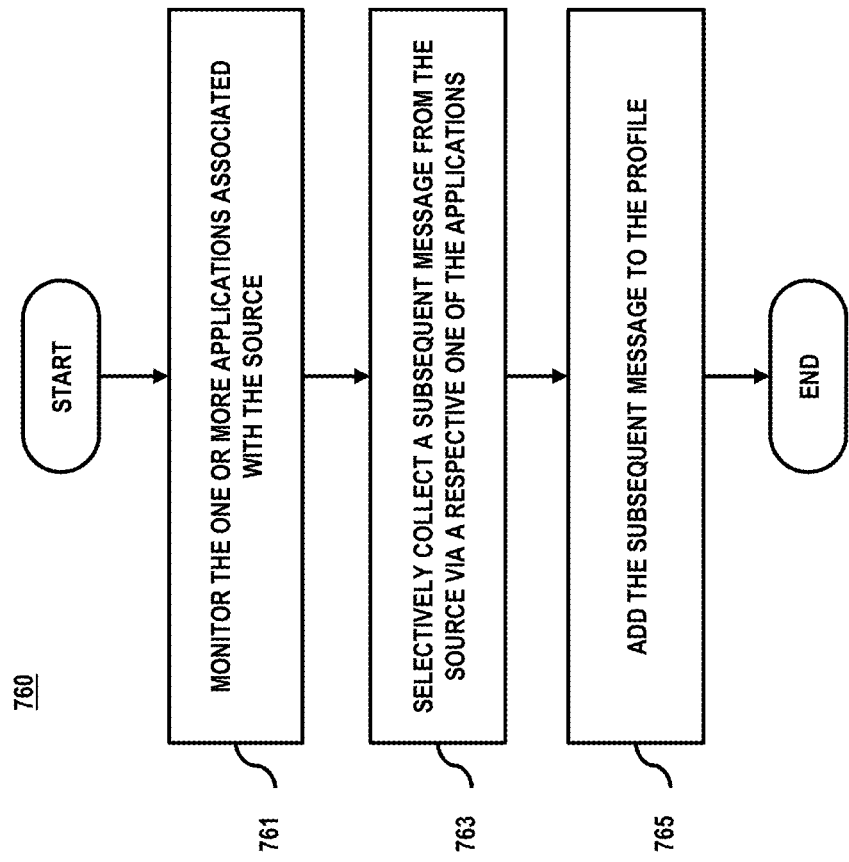

FIG. 7D illustrates the process 760 for selectively monitoring source based on a profile, according to one embodiment. In step 761, the service platform 101 receives the profile indicating a potential source of monitored conduct (e.g., the profile as generated in the process 740), and monitors the one or more applications and/or other data repositories associated with the source.

In step 763, the service platform 101 selectively collects (e.g., from the user) subsequent interaction data from the source via a respective one of the applications. The associated applications found by the service platform 101 are monitored and any interaction data accessed, received or sent by the application is retained and organized in order to provide proof of harassment for users. The analysis prior to the collection keeps non-pertinent interaction data out of the proof of harassment. In one embodiment, each interaction data, interaction data source, or combination thereof are analyzed and based on the analysis is selected to be collected and organized.

In step 765, the service platform 101 from the user adds the subsequent interaction data to the profile. In one embodiment, the collection of the interaction data is referenced to the profile of the source. In order to better organize the retained interaction data the profile of the source is used to clearly delineate which source the interaction data pertains to.

FIG. 8 is a flowchart of a process for harassment prevention by a third party, according to one embodiment. The process 800 is a continuation of either of the processes 700, 720, 740 and 760 of FIGS. 7A through 7D. Steps 803a and 805a may be taken separately or concurrently with steps 803b and 805b. The process 800 does not have to occur after processes 700, 720, 740 and 760 but in some cases to solve the user's harassment issue process 800 can be used. Especially in instances where the user does not know the harassing source. Steps 803a and 805a set out a process which pushes an application to the source and steps 803b and 805b set out a process where the third party authority remotely accesses the user device and imitates the user.

In step 801, the service platform 101 from a designated third party receives a profile from a user designating a source as a candidate for harassment. The user sends a report to the targeted third party which may include authorities, management, parents, law enforcement officers, etc. The report includes the source's profile which contains all information about the source as well as pertinent interaction data to prove the harassment of the user by the source.

In step 803a, the service platform 101 from a designated third party pushes an application for monitoring to the source. The third party uses its access with to the source through the service provider by pushing the harassment prevention platform onto the source which runs in the background of a source device. In this manner the harasser can continue to go about their bullying actions and more information can be collected about the harasser as well as further acts of harassment against others (since bullies generally harass more than just one person). This might also give the third party the ability to find out about other bullies.

In step 805a, the service platform 101 from a designated third party selectively collects interaction data through the application at the source. The bully will continue to act the in the same manner after the application is pushed onto their device since they achieve no notice. As such, any further interaction data will be retained and proof of harassment achieved.

In step 803b, the service platform 101 from a designated third party remotely accesses user device for control of the one or more applications. In one embodiment, the third party tunnels into a user device and controls the applications used in messaging between the user and harasser. The third party uses its control of the application to hide its access to the user as well as imitating the user in order to obtain results. Control may include the ability to send interaction data through applications on the user device or turn on/off specific services of the device without the user's allowance. For example, should a user be bullied in person the third party could record sound and video from the phone In step 805b, the service platform 101 from a designated third party determines the source based on interaction data collected through control of the one or more applications. The source, which has not fully been identified may now be identified through further messaging between the third party and the source. As such, the third party may now have the ability to stop the harassment of the user.

In step 807, the service platform 101 from a designated third party acts to stop the harassment. The third party then uses the proof and acts to control the harassment by stopping the now identified source from its continued harassment of the user.

FIG. 9 is a diagram of user interfaces for harassment prevention by a third party, according to various embodiments. As previously discussed, the service platform 101 enables a third party 901C to access a victim's device 901A. For example, law enforcement officers 901C can use a tunnel 905 to remotely take control of the victim's devices 901A and applications in order to collect more information about the harasser 901B by continuing to message between the harasser and the pretend victim (law enforcement officers) over the network 903. The law enforcement device 901C mirrors the victim's device 901A (while the application runs in the background of victim's device 901A. The law enforcement officers then use the mirroring to pretend to be the victim to get more information from the offender.

FIG. 10 is a diagram of a harassment report generated by the harassment prevention platform, according to one embodiment. The report of harassment 1000 is created by the service platform 101 which may display stored information from the interaction data database 103, app database 107, and user profiles 109. A harasser may have a harassment profile 1001 which may be an identifier of the source of harassment such as harasser real name, screen name, IP address, email address, telephone number or other digital identifier. The user name of the victim 1003 is also displayed in order to relate the profiles as well as any related harassers 1005 or victims 1007 as found through additional harassment data.

The interaction data that has been recorded is organized and displayed in 1009. This data might include application type, time/date of interaction data, context data, interaction data itself, etc. or combination thereof. The data might include data from the victim device as well as the harasser device (should authorities have pushed a harassment prevention application to the harasser's device(s). In FIG. 10 context includes "H→V" which is defined as harasser to victim interaction, "H→H" which is defined as harasser to additional harasser interaction, and "Loc" which is defined as the location an interaction occurs. The Email app interaction data is notably from a harasser's device whereas the SMS and Sd. Rec. (sound recording) are from the victim's device.

In other embodiments the report may be generated by the UI and/or website. The report may also include other identification of harassers such as MAC ID, mobile directory numbers, aliases, email ID's, location information, persona ID's, etc. as well as duration of interaction data, frequency of harassment instances, specific words/phrases/elements used in harassment. In other embodiments, the reports may be fully searched for any known data.

FIG. 11 is a diagram of a computer system that can be used to implement various exemplary embodiments. The computer system 1100 may be coupled via the bus 1101 to a display 1111, such as a cathode ray tube (CRT), liquid crystal display, active matrix display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multiprocessing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
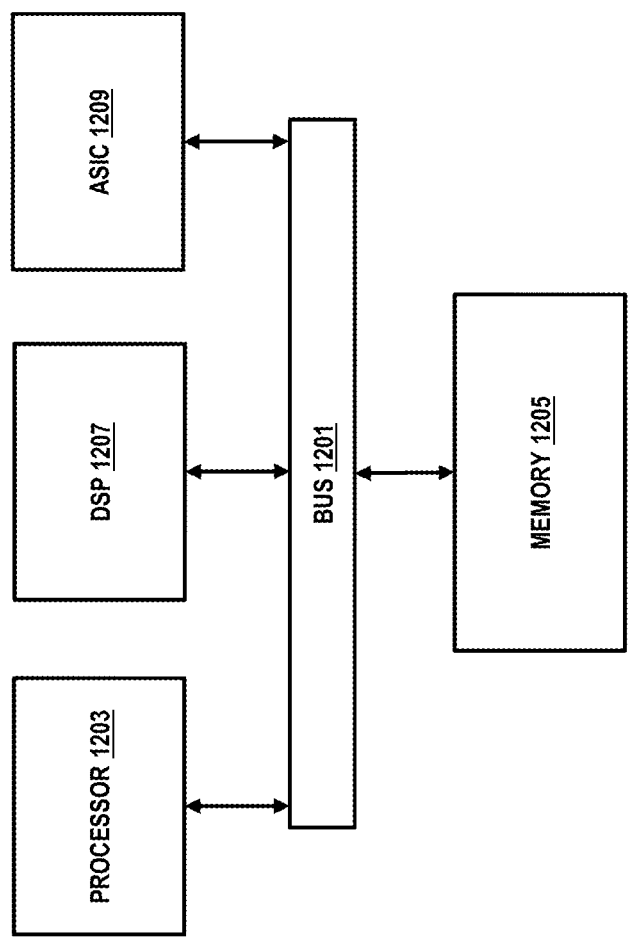
FIG. 12 is a diagram of a chip set that can be used to implement various exemplary embodiments.

FIG. 12 illustrates a chip set 1200 upon which an embodiment of the invention may be implemented. Chip set 1200 is programmed to present a slideshow as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of various embodiments described herein.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1205 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method performed by a computer device, comprising:
   monitoring interaction data from one or more applications, wherein the interaction data is associated with monitored conduct between a source party and a target party and includes:
   communication data between the source party and the target party, wherein the communication data includes at least one of messaging data, calling data, or contextual data associated with at least one of the source party, a source device associated with the source party, the target party, or a target device associated with the target party,
   global positioning system (GPS) information associated with the source party and the target party, and
   sensor-based movement information associated with at least one of the source party or the target party;
   analyzing the interaction data to parse one or more indicators of the monitored conduct between the source party and the target party, wherein the monitored conduct includes at least one of a bullying conduct, an offensive conduct, or an illegal conduct and identifies a proximity of the source party with respect to the target party for a period of time and a potentially-threatening movement including at least one of:
   the source party moving quickly towards the target party,
   the source party following the target party for extended periods of time, or
   the source party maintaining close proximity to the target party; and
   initiating, based on the monitored conduct and the one or more indicators,
   (a) a recording of the interaction data;
   (b) a transmission of at least one of an alert message, the one or more indicators, the recorded interaction data, or the monitored conduct; and
   (c) a pushing of an anti-harassment application to at least one of the source device or the target device.

2. A method of claim 1,
   wherein initiating the recording of the interaction data includes signaling one or more camera devices located in an area associated with the GPS information to capture images of the interaction data.

3. A method of claim 1, further comprising:
   comparing the one or more indicators to a dictionary of one or more reference indicators to identify the monitored conduct.

4. A method of claim 3, further comprising:
   receiving an input for customizing the dictionary for the source party, the target party, the monitored conduct, or a plurality of locations.

5. A method of claim 1, wherein the anti-harassment application provides a remote access capability, a remote control capability, a remote monitoring capability, or a combination thereof by a third party with respect to the source device, the target device, or a combination thereof.

6. A method of claim 1, further comprising:
   determining metadata associated with the interaction data, the source party, the source device, the target party, the target device, or a combination thereof, wherein the metadata includes contextual information, device identification data, network identification data, communication identification data, or a combination thereof, and
   generating a report of the interaction data, the monitored conduct, the metadata, or a combination thereof.

7. A method of claim 6, further comprising:
   searching for other interaction data, one or more other indicators, other monitored conduct, or a combination thereof based on the metadata.

8. A method of claim 1, further comprising:
   monitoring other interaction data between one or more other source parties, one or more other target parties, or a combination thereof for the one or more indicators, the monitored conduct, or a combination thereof.

9. A method of claim 1, further comprising:
   generating a profile for the source party, the target party, or a combination thereof based on the interaction data, the one or more indicators, the monitored conduct, or a combination thereof.

10. An apparatus comprising a processor configured to cause the apparatus to:
    monitor interaction data from one or more applications, wherein the interaction data is associated with monitored conduct between a source party and a target party and includes:
    communication data between the source party and the target party, wherein the communication data includes at least one of messaging data, calling data, or contextual data associated with at least one of the source party, a source device associated with the source party, the target party, or a target device, associated with the target party,
    global positioning system (GPS) information associated with the source party and the target party, and
    sensor-based movement information associated with at least one of the source party or the target party;
    analyze the interaction data to parse one or more indicators of the monitored conduct between the source party and the target party, wherein the monitored conduct includes at least one of a bullying conduct, an offensive conduct, or an illegal conduct and identifies a proximity of the source party with respect to the target party for a period of time and a potentially-threatening movement including at least one of:
    the source party moving quickly towards the target party,
    the source party following the target party for extended periods of time, or
    the source party maintaining close proximity to the target party; and
    initiate, based on the monitored conduct and the one or more indicators,
    (a) a recording of the interaction data;
    (b) a transmission of at least one of an alert message, the one or more indicators, the recorded interaction data, or the monitored conduct; and
    (c) a pushing of an anti-harassment application to at least one of the source device or the target device.

11. The apparatus of claim 10,
    wherein to initiate the recording of the interaction data, the processor is configured to signal one or more camera devices located in an area associated with the GPS information to capture images of the interaction data.

12. The apparatus of claim 10, wherein the processor is further configured to cause the apparatus to:
compare the one or more indicators to a dictionary of one or more reference indicators to identify the monitored conduct.

13. The apparatus of claim 12, wherein the processor is further configured to cause the apparatus to:
receive an input for customizing the dictionary for the source party, the target party, the monitored conduct, or a plurality of locations.

14. The apparatus of claim 10, wherein the anti-harassment application provides a remote access capability, a remote control capability, a remote monitoring capability, or a combination thereof by a third party with respect to the source device, the target device, or a combination thereof.

15. The apparatus of claim 10, wherein the processor is further configured to cause the apparatus to:
determine metadata associated with the interaction data, the source party, the source device, the target party, the target device, or a combination thereof, wherein the metadata includes contextual information, device identification data, network identification data, communication identification data, or combination thereof; and
generate a report of the interaction data, the monitored conduct, the metadata, or a combination thereof.

16. The apparatus of claim 15, wherein the processor is further configured to cause the apparatus to:
search for other interaction data, one or more other indicators, other monitored conduct, or a combination thereof based on the metadata.

17. The apparatus of claim 10, wherein the processor is further configured to cause the apparatus to:
monitor other interaction data between one or more other source parties, one or more other target parties, or a combination thereof for the one or more indicators, the monitored conduct, or a combination thereof.

18. A non-transitory computer-readable storage medium containing instructions executable by a processor, the non-transitory computer-readable storage medium storing instructions for:
monitoring interaction data from one or more applications, wherein the interaction data is associated with monitored conduct between a source party and a target party and includes:
communication data between the source party and the target party, wherein the communication data includes at least one of messaging data, calling data, or contextual data associated with at least one of the source party, a source device associated with the source party, the target party, or a target device, associated with the target party,
global positioning system (GPS) information associated with the source party and the target party, and
sensor-based movement information associated with at least one of the source party or the target party;
analyzing the interaction data to parse one or more indicators of the monitored conduct between the source party and the target party, wherein the monitored conduct includes at least one of a bullying conduct, an offensive conduct, or an illegal conduct and identifies at least one of a proximity of the source party with respect to the target party for a period of time or a movement including at least one of:
the source party moving quickly towards the target party,
the source party following the target party for extended periods of time, or
the source party maintaining close proximity to the target party; and
initiating, based on the monitored conduct and the one or more indicators,
(a) a recording of the interaction data;
(b) a transmission of at least one of an alert message, the one or more indicators, the recorded interaction data, or the monitored conduct; and
(c) a pushing of an anti-harassment application to at least one of the source device or the target device.

19. The non-transitory computer-readable storage medium of claim 18,
wherein when initiating the recording of the interaction data, the processor further executes the one or more instructions to signal one or more camera devices located in an area associated with the GPS information to capture images of the interaction data.

20. The non-transitory computer-readable storage medium of claim 18, wherein the processor further executes the instructions for comparing the one or more indicators to a dictionary of one or more reference indicators to identify the monitored conduct.

* * * * *